(12) United States Patent
Zhang et al.

(10) Patent No.: US 7,331,584 B2
(45) Date of Patent: Feb. 19, 2008

(54) CHUCK WITH NUTATING GEAR REDUCTION

(75) Inventors: Qiang J. Zhang, Baltimore, MD (US); Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/223,123

(22) Filed: Sep. 12, 2005

(65) Prior Publication Data

US 2006/0061049 A1 Mar. 23, 2006

Related U.S. Application Data

(60) Provisional application No. 60/610,531, filed on Sep. 17, 2004.

(51) Int. Cl.
 *B23B 31/165* (2006.01)
 *B23B 31/169* (2006.01)

(52) U.S. Cl. ................ 279/60; 279/62; 279/902; 409/200

(58) Field of Classification Search ............ 279/60, 279/62, 902, 61, 63, 55, 56, 134, 141; 409/200
See application file for complete search history.

(56) References Cited

U.S. PATENT DOCUMENTS

| | | | | |
|---|---|---|---|---|
| 655,697 | A | | 8/1900 | Dunn |
| 913,059 | A | * | 2/1909 | Savage ............... 279/62 |
| 1,159,248 | A | * | 11/1915 | Morrow .............. 279/60 |
| 1,503,809 | A | * | 8/1924 | Jakowitsch et al. ...... 279/70 |
| 1,509,061 | A | * | 9/1924 | Hardwicke ............ 279/60 |
| 1,750,023 | A | * | 3/1930 | Prigan ............... 279/60 |
| 2,661,700 | A | * | 12/1953 | Towler et al. ......... 417/206 |
| 3,311,384 | A | * | 3/1967 | Kawasaki ............. 279/62 |
| 3,506,277 | A | * | 4/1970 | Harms ............... 279/63 |
| 3,545,776 | A | * | 12/1970 | Haviland ............. 279/63 |
| 3,582,097 | A | * | 6/1971 | Elliott, Jr. ............ 279/61 |
| 3,640,154 | A | | 2/1972 | Massie |
| 4,260,169 | A | * | 4/1981 | Hall ................. 279/62 |
| 4,417,379 | A | * | 11/1983 | Goode ............... 29/35.5 |
| 4,527,637 | A | | 7/1985 | Bodine |
| 4,550,630 | A | * | 11/1985 | Remus .............. 475/163 |
| 4,660,841 | A | | 4/1987 | Chouinard |
| 4,682,918 | A | * | 7/1987 | Palm .............. 408/241 R |
| 4,930,793 | A | | 6/1990 | Ando |

(Continued)

FOREIGN PATENT DOCUMENTS

DE 4438991 5/1996

(Continued)

*Primary Examiner*—Monica Carter
*Assistant Examiner*—Michael W. Talbot
(74) *Attorney, Agent, or Firm*—Harness, Dickey & Pierce, P.L.C.

(57) ABSTRACT

A tool chuck may include a chuck body that supports chuck jaws. The chuck body may define a longitudinal axis. A driven gear may be mounted for rotation on the chuck body. The rotational axis of the driven gear may be parallel to the longitudinal axis of the chuck body. A nutating gear may be provided on the chuck body. The nutating gear may be nutatable about the chuck body to rotationally drive the driven gear relative to the chuck body so that the chuck jaws move along the longitudinal axis of the chuck body.

21 Claims, 12 Drawing Sheets

U.S. PATENT DOCUMENTS

| | | | | |
|---|---|---|---|---|
| 5,022,802 | A * | 6/1991 | Yokoi | 409/52 |
| 5,044,643 | A | 9/1991 | Nakamura | |
| 5,094,147 | A | 3/1992 | Shaw | |
| 5,125,673 | A | 6/1992 | Huff et al. | |
| 5,145,194 | A | 9/1992 | Huff et al. | |
| 5,172,923 | A | 12/1992 | Nakamura | |
| 5,174,588 | A | 12/1992 | Reibetanz et al. | |
| 5,215,317 | A | 6/1993 | Jordan et al. | |
| 5,261,679 | A | 11/1993 | Nakamura | |
| 5,322,303 | A | 6/1994 | Nakamura | |
| 5,348,318 | A | 9/1994 | Steadings et al. | |
| 5,435,578 | A | 7/1995 | Rohm | |
| 5,499,828 | A | 3/1996 | Salpaka et al. | |
| 5,511,801 | A * | 4/1996 | Kanaan et al. | 279/52 |
| 5,553,873 | A | 9/1996 | Salpaka et al. | |
| 5,701,779 | A | 12/1997 | Carter | |
| 5,820,134 | A * | 10/1998 | Subils Valls | 279/61 |
| 5,918,887 | A | 7/1999 | Miles | |
| 5,927,914 | A * | 7/1999 | Mack et al. | 408/240 |
| 6,042,310 | A * | 3/2000 | Campbell et al. | 409/131 |
| 6,045,141 | A | 4/2000 | Miles et al. | |
| 6,139,228 | A | 10/2000 | Longo | |
| 6,217,033 | B1 | 4/2001 | Sakamaki et al. | |
| 6,224,306 | B1 | 5/2001 | Hiroumi et al. | |
| 6,296,257 | B1 * | 10/2001 | Huff et al. | 279/62 |
| 6,390,481 | B1 | 5/2002 | Nakamuro | |
| 6,581,942 | B2 | 6/2003 | Rohm | |
| 6,595,527 | B2 * | 7/2003 | Mack | 279/62 |
| 6,616,148 | B1 * | 9/2003 | Corcoran | 279/62 |
| 6,659,474 | B2 | 12/2003 | Sakamaki et al. | |
| 6,832,880 | B2 * | 12/2004 | Colombo | 409/230 |
| 7,021,400 | B2 * | 4/2006 | Oretti | 173/29 |
| 2004/0108662 | A1 | 6/2004 | Sakamaki et al. | |

FOREIGN PATENT DOCUMENTS

| | | | |
|---|---|---|---|
| FR | 2612820 A * | 9/1988 | |
| GB | 2352661 | 2/2001 | |
| JP | 64-46106 | 3/1989 | |
| JP | 5-9808 | 2/1993 | |
| JP | 5038608 | 2/1993 | |
| JP | 5-41608 | 6/1993 | |
| JP | 8276308 | 10/1996 | |
| JP | 11138314 | 5/1999 | |
| JP | 3060875 | 6/1999 | |
| JP | 2000158215 | 6/2000 | |
| JP | 2001205510 | 7/2001 | |
| JP | 2001353607 | 12/2001 | |
| JP | 2002052407 | 2/2002 | |
| JP | 2003071671 | 3/2003 | |
| JP | 2003136312 | 5/2003 | |
| WO | WO 96/40459 | 12/1996 | |
| WO | WO 96/40460 | 12/1996 | |
| WO | WO 97/06912 | 2/1997 | |

* cited by examiner

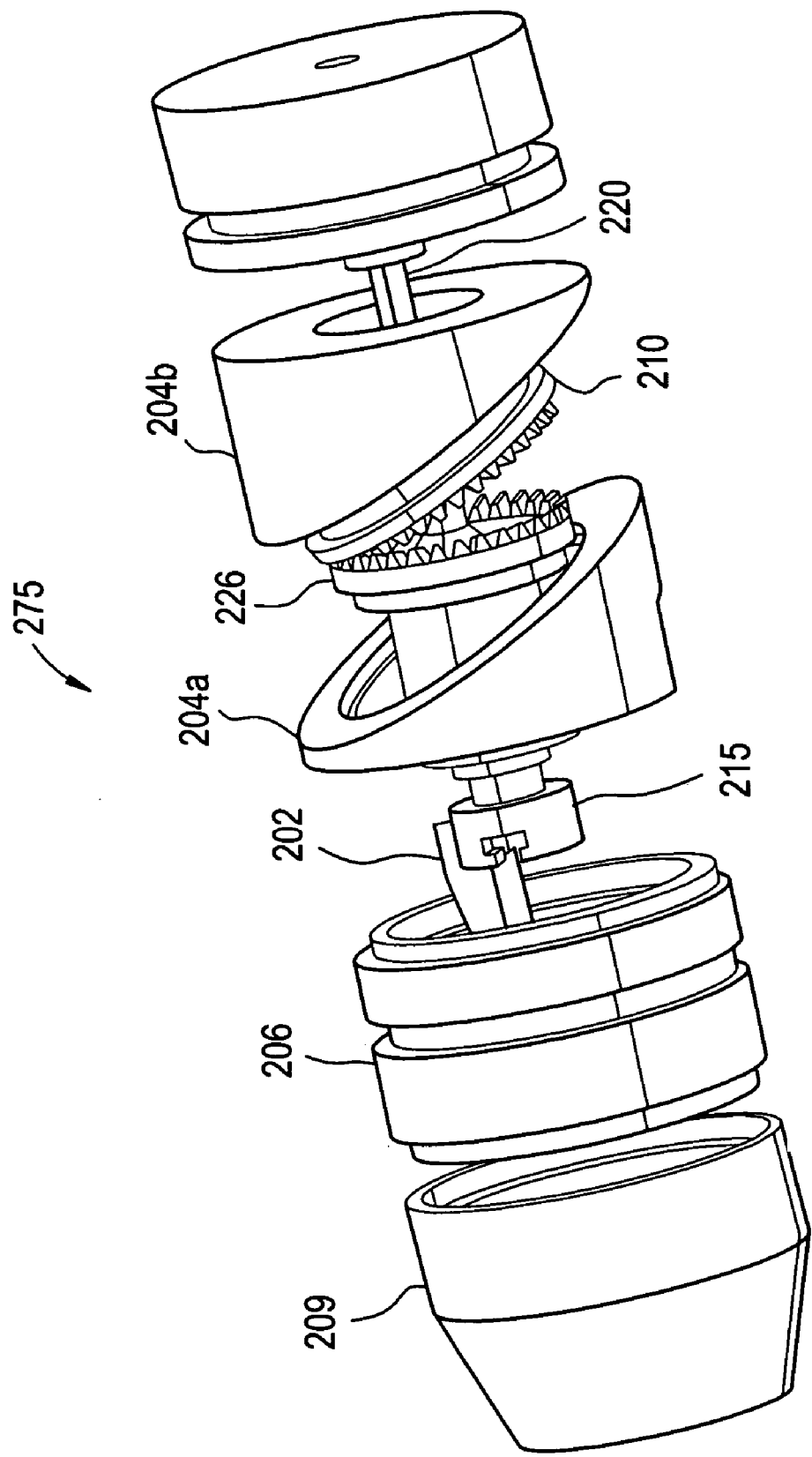

ABSOLUTE US 7,331,584 B2

CHUCK WITH NUTATING GEAR REDUCTION

CROSS REFERENCE TO RELATED APPLICATIONS

This US non-provisional application claims priority under 35 USC §119 to US Provisional Application No. 60/610,531 filed Sep. 17, 2004, the content of which is incorporated herein in its entirety by reference.

BACKGROUND

1. Field of the Invention

The present invention relates in general to tool chucks for attachment of accessories to power tools, and more particularly to a tool chuck that may be tightened without using a chuck key.

2. Description of Related Art

Conventional tool chucks may have a turn ring that is rotatable using a chuck key to extend and retract chuck jaws. Although such tool chucks are generally thought to provide acceptable performance, they are not without shortcomings. For example, the conventional tool chuck requires cumbersome chuck key operations, chuck key retention, and other inconveniences.

In view of the shortcomings associated with chuck keys, tool chucks have been developed that have a turn ring (or sleeve) that is rotated manually, without using a chuck key, to tighten the chuck jaws. However, it may be difficult to impart sufficient clamping force using a keyless tool chuck.

SUMMARY

According to an example, non-limiting embodiment of the present invention, a tool chuck may include a chuck body supporting chuck jaws. The chuck body may define a longitudinal axis. A driven gear may be provided on the chuck body. A nutating gear may be provided on the chuck body. The nutating gear may be nutatable about the chuck body to rotationally drive the driven gear relative to the chuck body so that the chuck jaws move along the longitudinal axis of the chuck body.

According to another example, non-limiting embodiment of the present invention, a tool chuck may include a chuck body having a longitudinal axis. A driven gear may be mounted for rotation on the chuck body. The driven gear may have a rotational axis that is parallel to the longitudinal axis. A drive gear may be mounted on the chuck body to rotationally drive the driven gear. The drive gear may have an axis this is inclined relative to the longitudinal axis of the chuck body.

According to another example, non-limiting embodiment of the present invention, a tool chuck may include a chuck body. A front sleeve may be mounted for rotation on the chuck body. The front sleeve may support a driven gear. A nutating gear may be provided on the chuck body. The nutating gear may be nutatable about the chuck body to rotationally drive the driven gear relative to the chuck body. The nutating gear may be provided in a housing sleeve. The housing sleeve may be mounted for rotation on the chuck body. The housing sleeve may rotatably support the front sleeve. A clutch and lock sleeve may be rotationally fixed to the housing sleeve. The clutch and lock sleeve may be axially moveable relative to the housing sleeve between (1) a first position that permits relative rotation between the chuck body and the front sleeve, and (2) second position that rotationally locks together the chuck body and the front sleeve.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

The present invention will become more fully understood from the detailed description below and the accompanying drawings, wherein like elements are represented by like reference numerals, which are given by way of illustration only and thus are not limiting of the present invention.

FIG. 6 is a partial exploded view of the tool chuck depicted in FIG. 5A.

DETAILED DESCRIPTION OF EMBODIMENTS

I. Example Embodiment Depicted in FIGS. 1-3

Figure 1A:
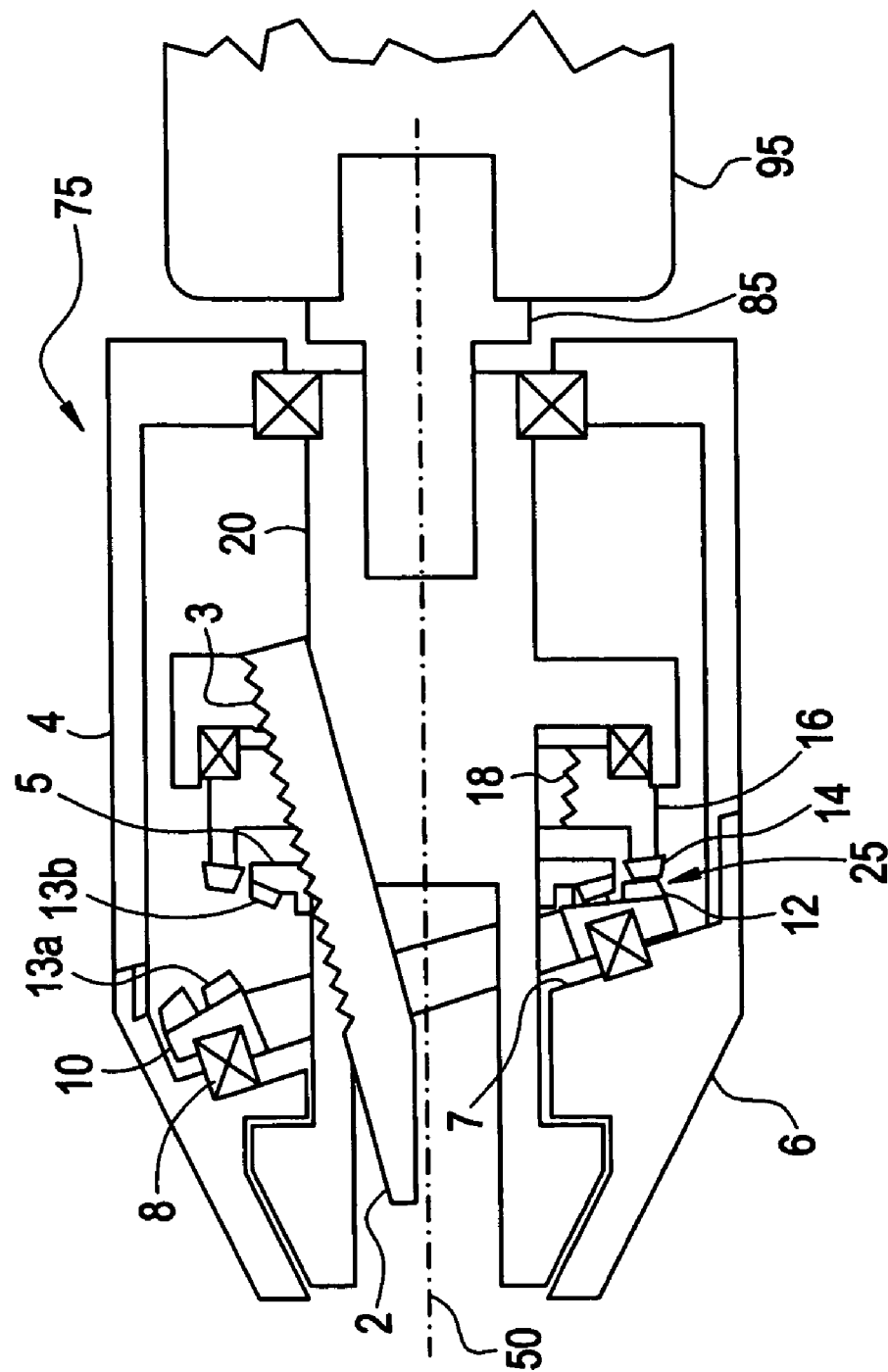
FIGS. 1A and 1B are schematic illustrations of a tool chuck with a nutating gear reduction according to an example, non-limiting embodiment of the present invention.

FIG. 1A shows an example, non-limiting embodiment of a tool chuck 75 with a nutating gear reduction. The tool chuck 75 may be provided on a power driver (e.g., a drill) for holding a tool (e.g., a drill bit). It will be appreciated, however, that the tool chuck 75 may be suitably implemented on a variety of power drivers (other than drills) for holding a variety of tools (other than drill bits).

A. The Structure:

With reference to FIG. 1A, the tool chuck 75 may include a chuck body 20. The rear end of the chuck body 20 may be mounted on a spindle 85 of a power driver 95. The forward end of the chuck body 20 may have passageways that slidably support a plurality of chuck jaws 2. The chuck jaws 2 may be inclined so that respective forward ends of the chuck jaws converge toward an axis 50 of the chuck body 20. The chuck jaws 2 may have respective radially outward facing threads 3. For clarity of illustration, only a single chuck jaw 2 is depicted in FIG. 1.

In this example embodiment, the chuck jaws 2 may be characterized as "threaded" chuck jaws. That is, the chuck jaws 2 may be actuated (i.e., advanced and/or retracted) via the radially outward facing threads 3 interacting with radially inward facing threads 18 of a nut 16. However, the present invention is not limited in this regard. For example, the nutating gear reduction may be suitably implemented using "pusher" jaws, as will be discussed below with respect to other example, non-limiting embodiments of the present invention.

Figure 2:
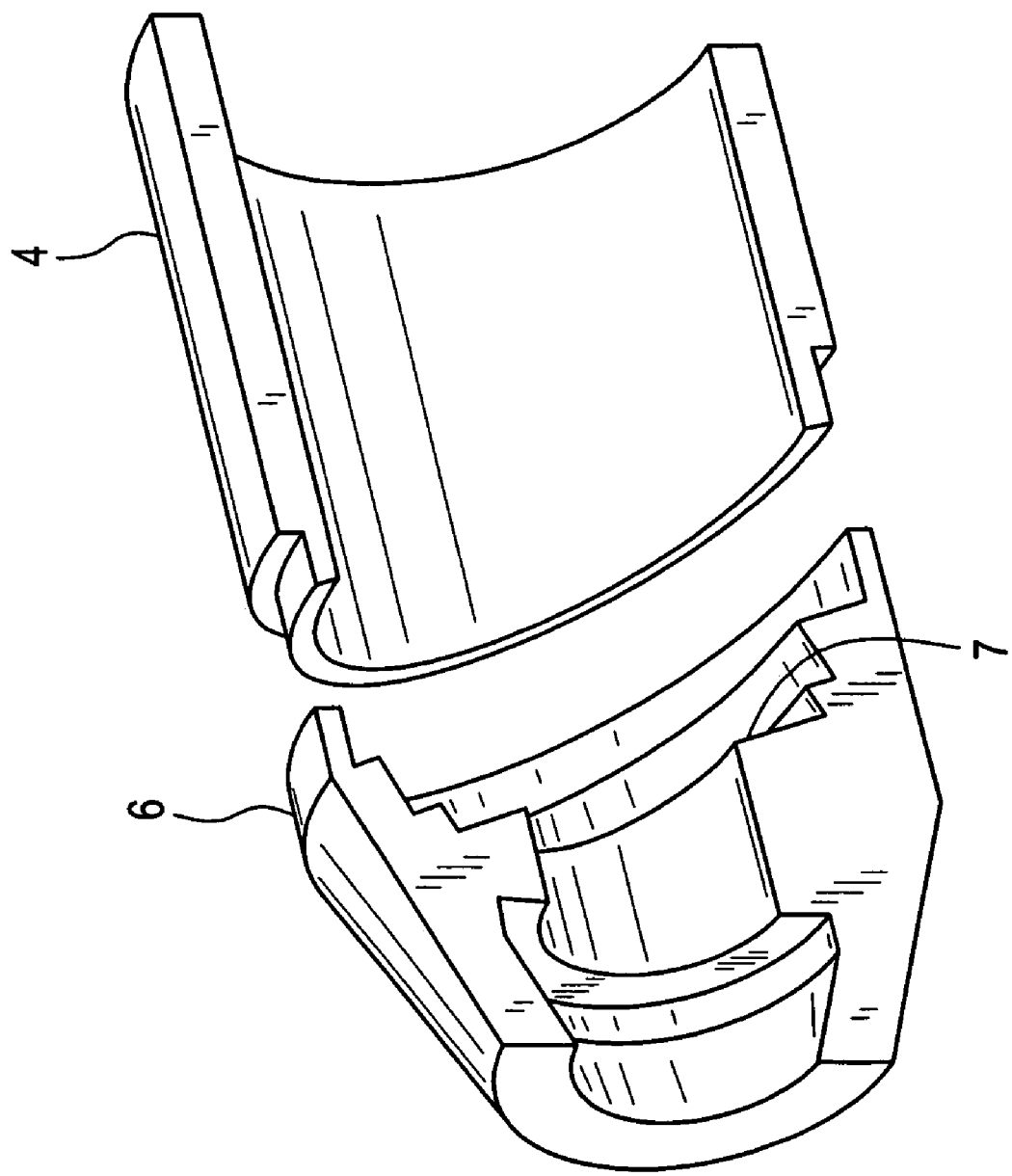
FIG. 2 is an exploded view of a front sleeve and a rear sleeve that may be implemented in the tool chuck depicted in FIGS. 1A and 1B.

The chuck body 20 may rotatably support a rear sleeve 4 and a front sleeve 6. Turning briefly to FIG. 2, the rear sleeve 4 and the front sleeve 6 may be provided as two separate and distinct elements to facilitate assembly of the tool chuck 75. It will be appreciated, however, that the rear sleeve 4 and the front sleeve 6 may be formed of a unitary, one-piece construction. The rear sleeve 4 and the front sleeve 6 may be rotationally fixed together. In this way, the rear sleeve 4 and the front sleeve 6 may be rotated together relative to the chuck body 20. The front sleeve 6 may have a rear face 7 that is inclined relative to the axis 50. The rear face 7 of the front sleeve 6 may act on the front face of a nutating gear 10 through the bearing 8.

The nutating gear 10 may be arranged in the tool chuck 75 such that its axis is inclined relative to the axis 50 of the chuck body 20. The chuck body 20 may extend through an opening of the nutating gear 10. The rear face of the nutating gear 10 may include a set of teeth 12 that interact with the nut 16, and a set of teeth 13a that interact with a fixing gear 5.

The fixing gear 5 may be fixed to the chuck body 20. The chuck body 20 may extend through an opening of the fixing gear 5. The front face of the fixing gear 5 may include a set of teeth 13b that engage with the teeth 13a on the nutating gear 10. The number of teeth 13b on the fixing gear 5 and the number of teeth 13a on the nutating gear 10 may be selected so that the nutating gear 10 and the fixing gear 5 (and thus the chuck body 20) maintain the same relative rotational positions with respect to each other. Thus, as the nutating gear 10 nutates, the two sets of teeth 13a, 13b may interact so that the fixing gear 5 prevents the nutating gear 10 from rotating relative to the chuck body 20 about the axis 50. For example, an equal number of teeth 13a, 13b may be provided so that the fixing gear 5 prevents a rotational movement of the nutating gear 10 relative to the chuck body 20 about the axis 50.

The invention is not limited to a nutating gear 10 that is rotationally fixed to the chuck body 20. For example, different numbers of teeth 13a, 13b may be provided so that the nutating gear 10 rotates relative to the chuck body 20. Such relative rotation (between the nutating gear 10 and the chuck body 20) may be controlled by varying the difference in the number of teeth 13a, 13b. In this regard, the rotational movement of the nutating gear 10 (relative to the chuck body 20) may be restrained by the interacting teeth 13a, 13b.

It will be appreciated that the nutating gear 10 may be rotationally fixed to the chuck body 20 by structure other than the fixing gear 5. For example, the chuck body 20 may include splines (not illustrated) that are received in radially inward facing passages (not illustrated) provided in the nutating gear 10. Such passages may extend along a longitudinal axis of the nutating gear 10. Thus, as the nutating gear 10 nutates, the splines may pass back and forth through the passages and at the same time prevent the nutating gear 10 from rotating relative to the chuck body 20. The cooperating splines and inward facing passages will be described and illustrated with respect to other example embodiments.

A bearing 8 may be interposed between the front sleeve 6 and the nutating gear 10 to facilitate a relative rotational movement between the front sleeve 6 and the nutating gear 10.

The nut 16 may be mounted for rotation about the chuck body 20. The nut 16 may be of a unitary, one-piece construction or of a split nut variety, as is well known in this art. The nut 16 may have radially interior threads 18 that engage the radially outward facing threads 3 on the chuck jaws 2 for advancing and/or retracting the chuck jaws 2. The chuck body 20 may extend through an opening of the nut 16. The nut 16 may have a front face that is provided with a set of teeth 14. The teeth 14 of the nut 16 may engage with the teeth 12 of the nutating gear 10.

The nutating gear 10 may be inclined relative to the nut 16 so that the teeth 12 of nutating gear 10 may only touch the teeth 14 of the nut 16 at one contact area 25. Thus, the diameter and circumference of the nutating gear 10 may be larger than that of the nut 16. Further, the corresponding sets of teeth 12, 14 may be of the same pitch so that the larger nutating gear 10 may have more teeth 12 around its circumference than does the smaller nut 16.

Figure 1B:
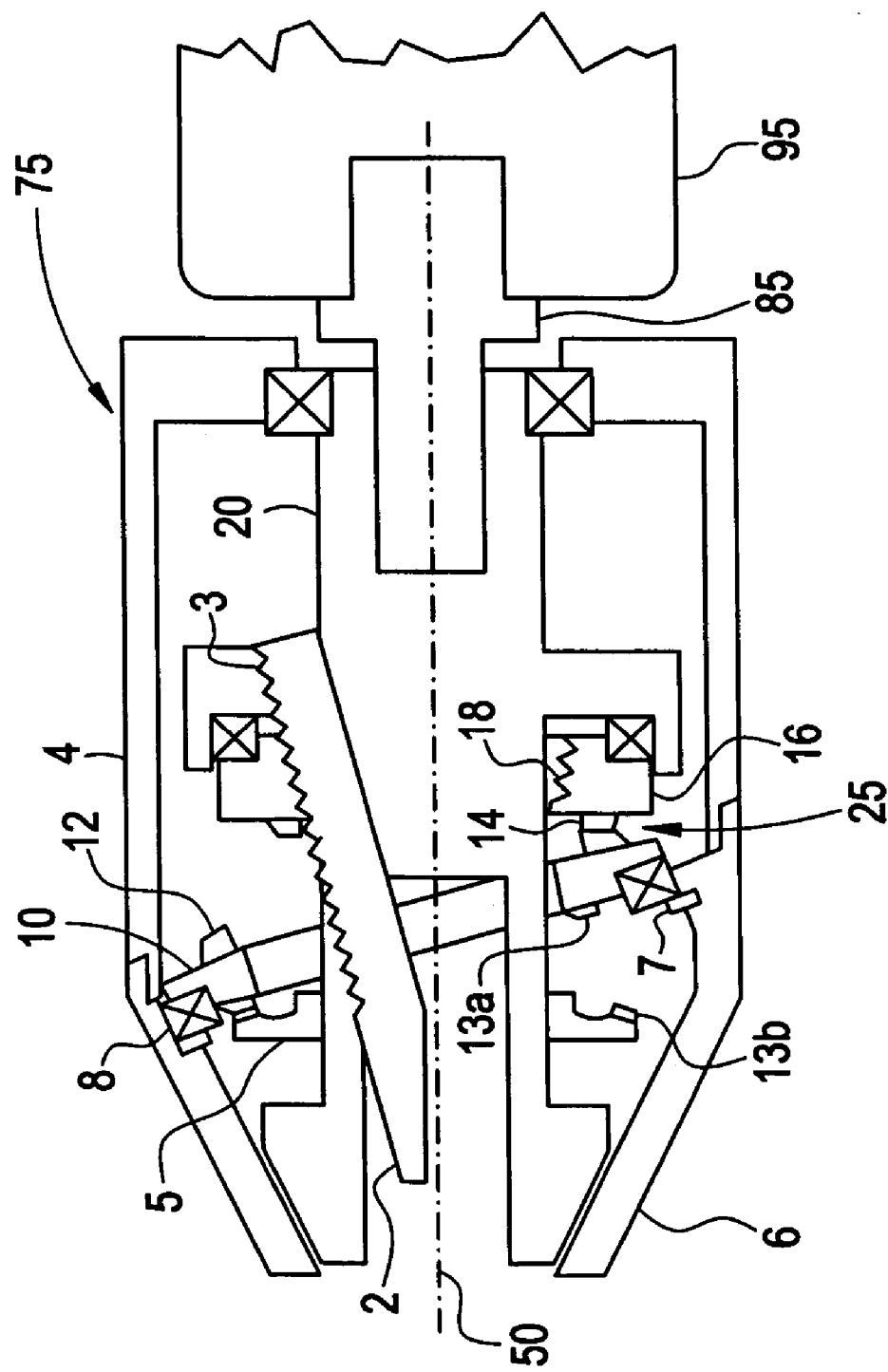

In the embodiment depicted in FIG. 1A, the sets of teeth 12 and 13a are provided on the same face of the nutating gear 10, and thus the fixing gear 5 and the nut 16 are provided on the same side of the nutating gear 10. However, the invention is not limited in this regard. For example, as shown in FIG. 1B, the sets of teeth 12 and 13a may be provided on opposite faces of the nutating gear 10. Here, the fixing gear 5 and the nut 16 are provided on opposite sides of the nutating gear 10. In all other respect, the tool chuck 75 depicted in FIG. 1B may be similar to the tool chuck 75 depicted in FIG. 1A.

Figure 3A:
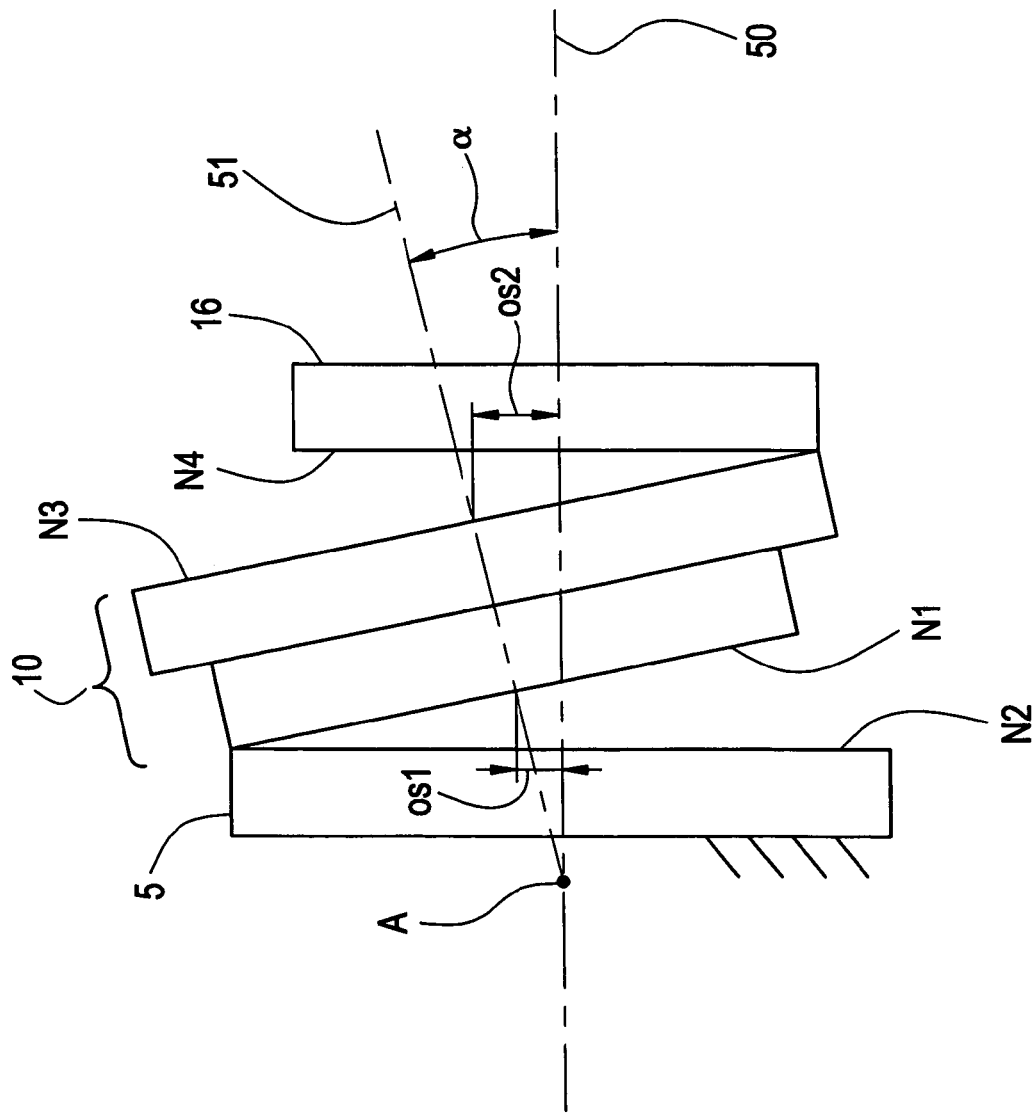
FIG. 3A is a schematic illustration of the nutating gear reduction system depicted in FIG. 1B.

A gear ratio of the nutating gear reduction will be appreciated with reference to FIG. 3A, which schematically depicts the fixing gear 5, the nutating gear 10, and the nut 16 arranged as shown in FIG. 1B. The gear ratio may be determined according to the following formula:

$$\text{Gear ratio} = N1*N4/(N1*N4-N2*N3),$$

where N1 is the number of teeth 13a of the nutating gear 10, N2 is the number of teeth 13b of the fixing gear 5, N3 is the number of teeth 12 of the nutating gear 10, and N4 is the number of teeth 14 of the nut 16. Thus, a designer may appropriately alter the teeth numbers N1 to N4 to obtain the desired gear reduction.

For example, consider a scenario in which the number N1 of teeth 13a of the nutating gear is 24, the number N2 of teeth 13b of the fixing gear is 24, the number N3 of teeth 12 of the nutating gear is 27, and the number N4 of teeth 14 of the nut is 25. Here, the gear ratio would equal 24*25/(24*25−24*27) or −12.5. A gear ratio of −12.5 means that 12.5 turns of the rear sleeve 4 would cause the nut 16 to rotate through 1 complete revolution. The negative value of the gear ratio indicates that the rear sleeve 4 and the nut 16 rotate in opposite directions. It will be appreciated that the threads 3 of the chuck jaws 2 and the threads 18 of the nut 16 may be left-handed threads or right-handed threads to achieve the desired chuck jaw actuation. For example, the threads 3, 18 may be appropriately selected so that a clockwise rotation of the rear sleeve 4 (as viewed from the front end of the tool chuck) causes the chuck jaws 2 to advance.

The interfacing teeth sets 13a, 13b (and 12, 14) may have the same pitch, and therefore the designer may alter the diameters of the gears to alter ratios of the interfacing teeth sets. That is, the diameters of the respective gears may be altered to achieve a desired gear ratio. To this end, the designer may vary parameters inclusive of a nutating angle α and gear teeth offsets os1 and os2. The nutating angle a is defined as the angle a between the axis 50 of the chuck body 20 and the axis 51 of the nutating gear 10. As shown in FIG. 3A, the axes 50, 51 intersect at an apex "A." The gear teeth offset os1 is measured from the axis 50 to a point on the axis 51 passing through a plane containing the set of teeth 13a of the nutating gear 10. The gear teeth offset os2 is measured from the axis 50 to a point on the axis 51 passing through a plane containing the set of teeth 12 of the nutating gear 10.

B. The Operation:

The tool chuck 75 may operate as follows. An operator may turn the rear sleeve 4 relative to the chuck body 20 causing the front sleeve 6 to rotate relative to the chuck body 20. The slanted rear face 7 of the front sleeve 6 may act upon the front face of the nutating gear 10 (via the bearing 8), which may remain rotationally fixed relative to the chuck body 20 (via the fixing gear 5, for example), thereby causing the nutating gear 10 to nutate about the chuck body 20. As the nutating gear 10 nutates, the contact area 25 between the nutating gear 10 and the nut 16 rotates around the axis 50.

As stated above, the nutating gear 10 may be rotationally fixed. Thus, during one nutation of the nutating gear 10, the nut 16 may be driven to rotate by an angular distance equivalent to the difference between the number N3 of teeth 12 of the nutating gear 10 and the number N4 of teeth 14 of the nut 16. Thus, the nutating drive may be considered as a reduction gear system.

Figure 3B:
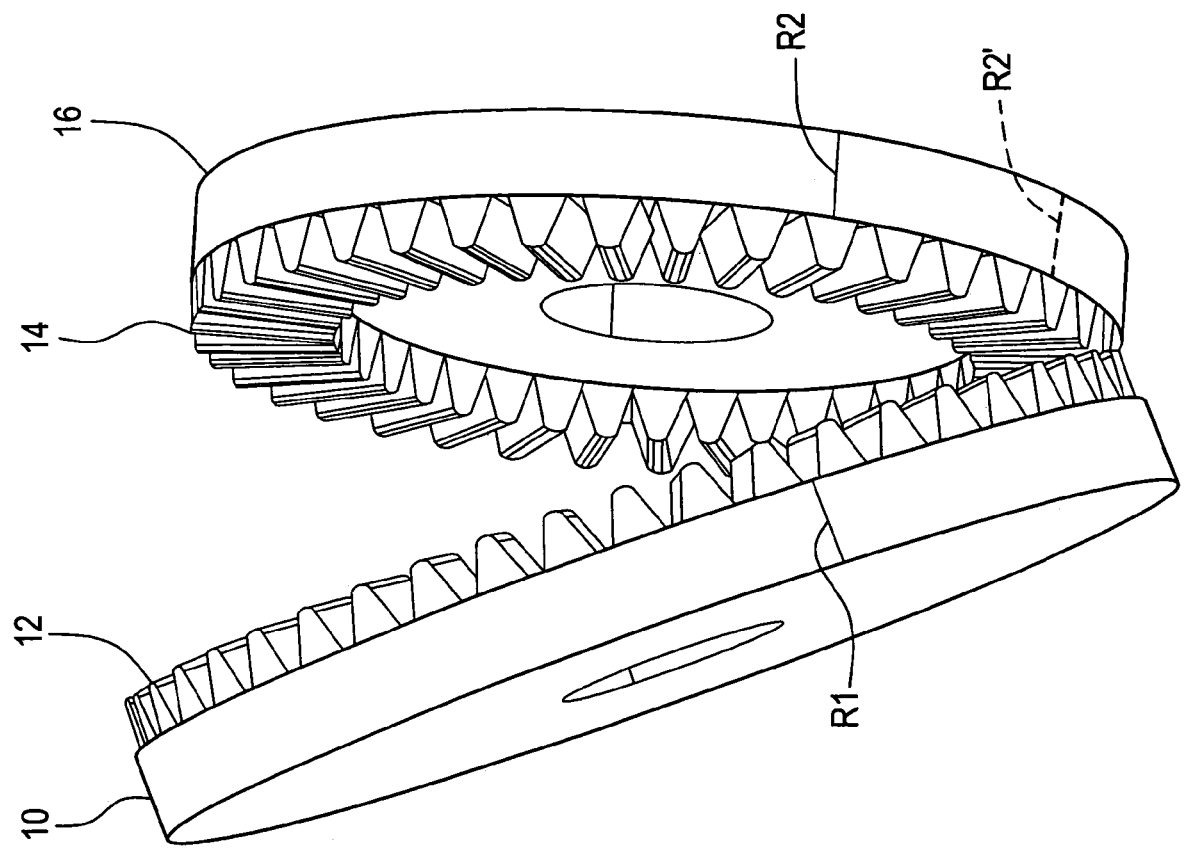
FIG. 3B is a partial perspective view of a nutating gear and a nut that may be implemented in the tool chuck depicted in FIGS. 1A and 1B.

The interaction between the nutating gear and the nut 16 will be appreciated with reference to the schematic view of FIG. 3B. FIG. 3B shows the nutating gear 10 with the teeth 12 (the teeth 13a, which interact with the fixing gear 5, are not illustrated for clarity of illustration; the nut's radially inward facing threads are also left out for clarity). Here, the nutating gear 10 includes a reference mark R1 and the nut 16 includes a reference mark R2. One rotation of the input sleeve 6 produces one nutation of the nutating gear 10. As the nutating gear 10 nutates, the reference mark R1 may remain at the same rotational position relative to the chuck body 20. One nutation of the nutating gear 10 may turn the nut 16 by only a fractional rotation. The fractional rotation of the nut 16 relative to the chuck body 20 is illustrated as the reference mark R2 moves to a position R2' (shown in phantom).

As the nut 16 is driven to rotate, it may in turn drive the chuck jaws 2 opened or closed (depending on the rotation direction) by virtue of the interaction between the radially inward facing threads 18 and the radially outward facing threads 3.

As compared to conventional tool chucks, the nutating drive described above may achieve a greater mechanical advantage for tightening the nut 16, which drives the jaws 2 into contact with a tool, such as a drill bit (for example).

As stated above, it will be appreciated that the difference in the numbers N3, N1 of teeth 12, 13a (respectively) provided on the nutating gear 10, the number N2 of teeth 13b provided on the fixing gear 5, and the number N4 of teeth 14 provided on the nut 16 may be varied to alter the final output drive ratio of driven nut 16.

II. Example Embodiment Depicted in FIGS. 4A-4C

Figure 4A:
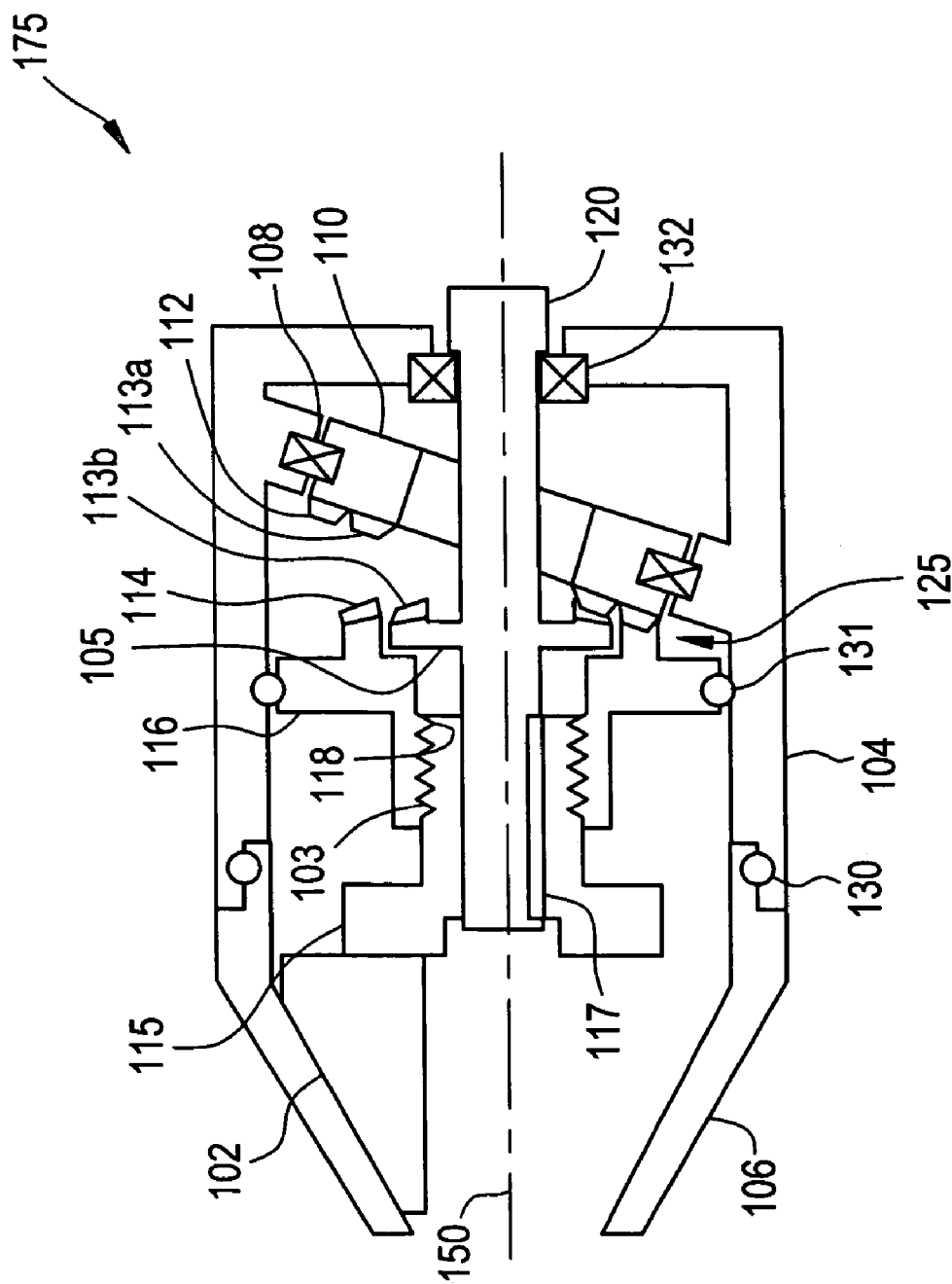
FIGS. 4A and 4C are schematic illustrations of a tool chuck with a nutating gear reduction according to another example, non-limiting embodiment of the present invention.

FIG. 4A shows another example, non-limiting embodiment of a tool chuck 175 with a nutating gear reduction. This example embodiment is similar to the previous example embodiment to the extent that it includes a nutating gear reduction. However, there are several notable differences as described below.

A. The Structure:

With reference to FIG. 4A, the tool chuck 175 may include a chuck body 120 defining an axis 150. As in the previous embodiment, the rear end of the chuck body 120 may be mounted on a spindle of a power driver.

In this example embodiment, the chuck jaws 102 are "pusher" chuck jaws 102, as opposed to the threaded chuck jaws described with respect to the previous, example embodiment. In this regard, the chuck jaws 102 may be advanced and/retracted relative to the chuck body 120 by a screw 115.

The chuck body 120 may extend through and support the screw 115 so that the chuck body 120 and the screw 115 may be rotationally fixed together and the screw 115 may be axially moveable relative to the chuck body 120 in the direction of the axis 150. The chuck body 120 may include a spline 117 that may be received in a corresponding feature provided on the screw 115. The spline 117 may guide the axial movement of the screw 115, and at the same time prevent a relative rotation between the chuck body 120 and the screw 115. It will be appreciated that the spline may instead be provided on the screw 115, and such spline may be received by a corresponding feature provided on the chuck body 120.

The rear end of the screw 115 may include radially outward facing threads 103 that interact with radially inward facing threads 118 of a nut 116. The interaction of the threads 103, 118 may influence the screw to advance and/or retract along the axis 150 of the chuck body 120. The forward end of the screw 115 may include radially oriented passageways in which the chuck jaws 102 are respectively supported. The radially oriented passageways may guide a radial movement of the chuck jaws 102, and at the same time may rotationally fix the chuck jaws 102 to the screw 115.

The chuck body 120 may support a two-part sleeve inclusive of a front sleeve 106 and a rear sleeve 104. The front sleeve 106 may include passageways through which the chuck jaws 102 are respectively slidable. The passageways of the front sleeve 106 may be inclined relative to the axis 150 of the chuck body 120. In this way, when the chuck jaws 102 are advanced (via the screw 115), the passageways of the front sleeve 106 may influence the chuck jaws 102 in a radial inward direction through the radially oriented passageways of the screw 115 and toward the axis 150. And when the chuck jaws 102 are retracted (via the screw 115), the passageways of the front sleeve 106 may influence the chuck jaws in a radial outward direction through the radially oriented passageways of the screw 115 and away from the axis 150. The passageways in the front sleeve 106 may rotationally fix the front sleeve 106 to the chuck jaws 102. Thus, the front sleeve 106, the chuck jaws 102, the chuck body 120, and the screw 115 may be rotationally fixed together.

Figure 4C:
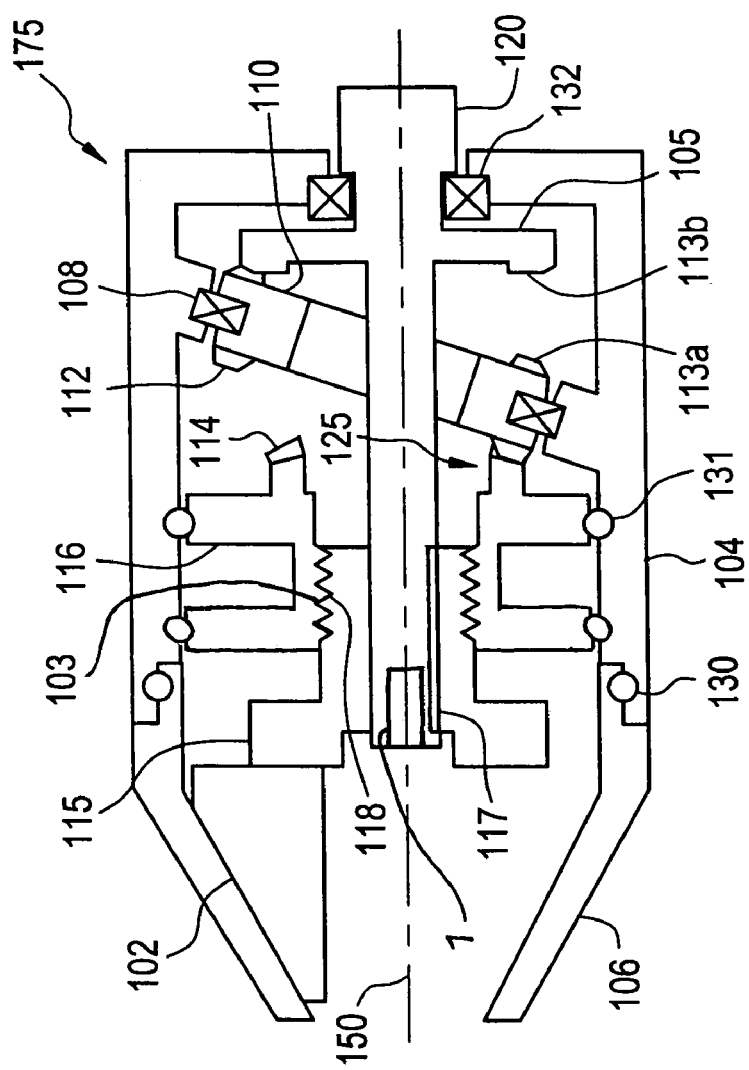
Figure 4B:
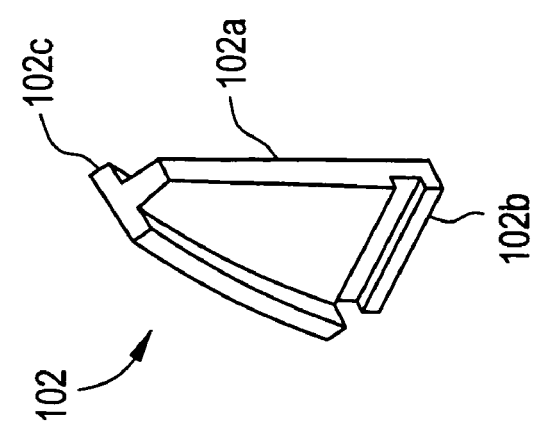
FIG. 4B is a perspective view of a chuck jaw that may be implemented in the tool chucks depicted in FIGS. 4A and 4C.

Turning briefly to FIG. 4B, an example pusher chuck jaw 102 is schematically illustrated. As shown, the chuck jaw 102 may have a tapered shape with a contact surface 102a. The chuck jaw 102 may have several features that cooperate with the various passageways provided in the tool chuck 175. For example, a first flange 102b may be provided to cooperate with the corresponding radially oriented passageway of the screw 115. And a second flange 102c may be provided to cooperate with the corresponding inclined passageway of the front sleeve 106. The chuck jaw flanges and the corresponding passageways may have complementary shapes. It will be readily apparent to those skilled in the art that the pusher chuck jaws 102 may have numerous and alternative features that cooperate with corresponding features of the tool chuck 175 to achieve the desired advancing and retracting movements of the chuck jaws 102.

Turning back to FIG. 4A, the rear sleeve 104 may be mounted for rotation on the chuck body 120 via a bearing 132. Thus, the rear sleeve 104 may be rotatable relative to the front sleeve 106. To facilitate this relative rotation, a bearing 130 may be interposed between the rear sleeve 104 and the front sleeve 106. The rear sleeve 104 may house a nutating gear 110 and the nut 116.

The nutating gear 110 may be mounted for rotation on the rear sleeve 104 such that its axis is inclined relative to the axis 150 of the chuck body 120. The chuck body 120 may extend through an opening of the nutating gear 110. The front face of the nutating gear 110 may include a set of teeth 112 that interact with the nut 116 and a set of teeth 113a that interact with a fixing gear 105.

The fixing gear 105 may be fixed to the chuck body 120. The chuck body 120 may extend through an opening of the fixing gear 105. It will be appreciated that the chuck body 120 and the fixing gear 105 may be of a unitary, one-piece construction. The rear face of the fixing gear 105 may include a set of teeth 113b that engage with the teeth 113a on the nutating gear 110. The number N2 of teeth 113b on the fixing gear 105 and the number N1 of teeth 113a on the nutating gear 110 may be selected so that the nutating gear 110 and the fixing gear 105 (and thus the chuck body 120) maintain the same relative rotational positions with respect to each other. Thus, as the nutating gear 110 nutates, the two sets of teeth 113a, 113b may interact so that the fixing gear 105 prevents the nutating gear 110 from rotating relative to the chuck body 120 about the axis 150. For example, the same numbers N1, N2 of teeth 113a, 113b (respectively) may be provided so that the fixing gear 105 prevents a rotational movement of the nutating gear 110 relative to the chuck body 120 about the axis 150.

As in the previous embodiment, the invention is not limited to a nutating gear 110 that is rotationally fixed to the chuck body 120. For example, different numbers N1, N2 of teeth 113a, 113b (respectively) may be provided so that the nutating gear 110 rotates relative to the chuck body 120. Such relative rotation (between the nutating gear 110 and the chuck body 120) may be controlled by varying the difference in the numbers N1, N2 of teeth 113a, 113b (respectively). In this regard, the rotational movement of the nutating gear 110 (relative to the chuck body 120) may be restrained by the interacting teeth 113a, 113b.

As in the previous embodiment, it will be appreciated that the nutating gear 110 may be rotationally fixed to the chuck body 120 by structure other than the fixing gear 105.

A bearing 108 may be interposed between the rear sleeve 104 and the nutating gear 110 to facilitate a relative rotational movement between the rear sleeve 104 and the nutating gear 110. The front face of the nutating gear 110 may be provided with a set of teeth 112.

The nut 116 may be axially fixed to the rear sleeve 104 and rotatable relative to the rear sleeve 104 via a bearing 131. The chuck body 120 may extend through an opening of the nut 116. The forward end of the nut 116 may include the radially inward facing threads 118 that interact with the radially outward facing threads 103 of the screw 115 for advancing and/or retracting the screw 115 (and thus the chuck jaws 102). The rear end of the nut 116 may be provided with a set of teeth 114. The teeth 114 of the nut 116 may engage with the teeth 112 of the nutating gear 110.

The nutating gear 110 may be inclined relative to the nut 116 so that the teeth 112 of nutating gear 110 may only touch the teeth 114 of the nut 116 at one contact area 125. Thus, the diameter and circumference of the nutating gear 110 may be larger than that of the nut 116. Further, the corresponding sets of teeth 112, 114 may be of the same pitch so that the larger nutating gear 110 may have more teeth 112 around its circumference than does the smaller nut 116.

In the embodiment depicted in FIG. 4A, the sets of teeth 112 and 113a are provided on the same face of the nutating gear 110, and thus the fixing gear 105 and the nut 116 are provided on the same side of the nutating gear 110. However, the invention is not limited in this regard. For example, as shown in FIG. 4C, the sets of teeth 112 and 113a may be provided on opposite faces of the nutating gear 110. Here, the fixing gear 105 and the nut 116 are provided on opposite sides of the nutating gear 110. Also, the nut 116 may be axially fixed to the rear sleeve 104 and rotatable relative to the rear sleeve 104 via two bearings 131. In alternative embodiments, another number of bearings 131 may be suitably implemented. Finally, as shown in FIG. 4C, the forward end of the chuck body 120 may include a blind hole 1. By way of example only, the blind hole 1 may have a hexagonal shape. The blind hole 1 may receive the shank of a tool. In other respects, the tool chuck 175 depicted in FIG. 4C may be similar to the tool chuck 175 depicted in FIG. 4A.

B. The Operation:

The tool chuck 175 may operate as follows. An operator may turn the rear sleeve 104 relative to the chuck body 120, the screw 115, the chuck jaws 102, the front sleeve 106, and the nutating gear 110. The rotation of the rear sleeve 104 may cause the nutating gear 110, which may remain rotationally fixed relative to the chuck body 120 (via the fixing gear 105, for example), to nutate about the chuck body 120. As the nutating gear 110 nutates, the contact area 125 between the nutating gear 110 and the nut 116 rotates around the axis 150.

As stated above, the nutating gear 110 may be rotationally fixed. Thus, during one nutation of the nutating gear 110, the nut 116 may be driven to rotate by an angular distance equivalent to the difference between the number N3 of teeth 112 of the nutating gear 110 and the number N4 of teeth 114 of the nut 116.

As the nut 116 is driven to rotate, it may drive the screw 115 to advance or retract along the axis 150 (depending on the rotation direction) by virtue of the interaction between the radially inward facing threads 118 and the radially outward facing threads 103. In this example embodiment, the advancing and retracting movements of the screw 115 may occur without any relative rotation between the screw 115 and the chuck body 120 (which remain rotationally fixed together via the spline 117, for example). The translational movement of the screw 115 may push or pull on the chuck jaws 102, thereby opening and/or closing the same.

For example, during a closing operation, the screw 115 (together with the chuck jaws 102) may be advanced along the axis 150. During this time, the inclined passageways of the front sleeve 106 may influence the chuck jaws 102 in a radial inward direction (i.e., toward the axis 150) through the radially oriented passageways of the screw 115.

As in the previous embodiment, the difference in the numbers N3, N1 of teeth 112, 113a (respectively) provided on the nutating gear 110, the number N2 of teeth 113b provided on the fixing gear 105, and the number N4 of teeth 114 provided on the nut 116 may be varied to alter the final output drive ratio of driven nut 116.

III. Example Embodiment Depicted in FIGS. 5A-6

Figure 5A:
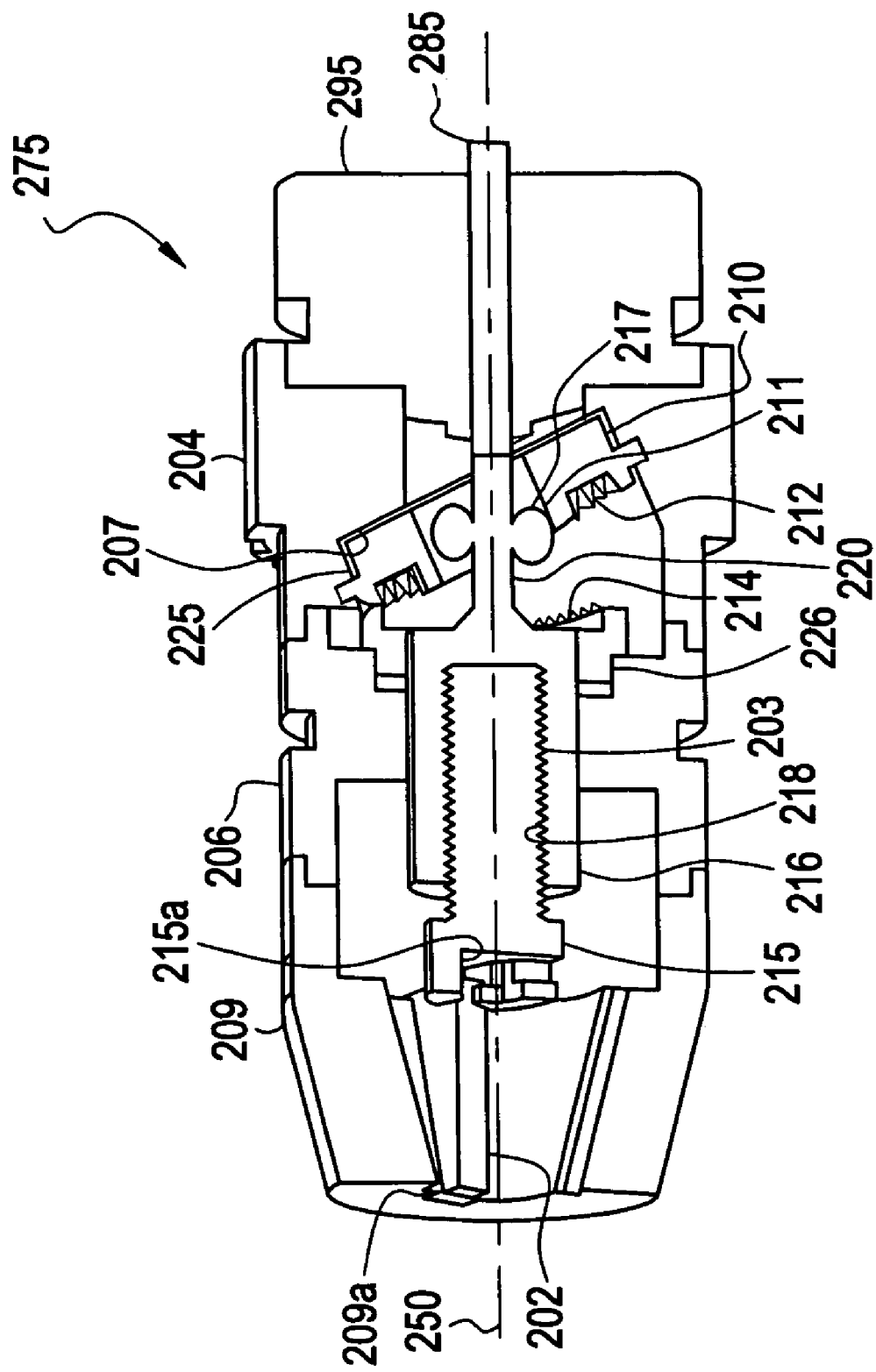
FIGS. 5A and 5B are schematic illustrations of a tool chuck with a nutating gear reduction according to another example, non-limiting embodiment of the present invention.

FIGS. 5A-6 show another example, non-limiting embodiment of a tool chuck 275 with a nutating gear reduction. This example embodiment is similar to the previous example embodiments to the extent that it includes a nutating gear reduction. Also, as in the example embodiment discussed above in section II, this example embodiment may implement "pusher" chuck jaws 202. However, there are several notable differences as described below.

A. The Structure:

With reference to FIG. 5A, the tool chuck 275 may include a chuck body 220 defining an axis 250. As in the previous embodiments, the rear end of the chuck body 220 may be mounted on a spindle 285 of a power driver 295.

An intermediate portion of the chuck body 220 may be provided with splines 217 that interact with radially inward facing passages 211 of a nutating gear 210. In this example embodiment, the splines 217 may have a spherical shape. However, it will be appreciated that splines 217 having numerous, alternative shapes may be suitably implemented. In this example embodiment, four splines 217 may be uniformly spaced around the circumference of the chuck body 220. However, the invention is not limited in this regard. For example, the number and the spacing between the splines 217 may be varied.

The forward end of the chuck body 220 may include a nut 216. The nut 216 may be screw coupled to a screw 215. To this end, the nut 216 may have radially interior threads 218 that engage radially outward facing threads 203 of the screw 215. The chuck body 220 (together with the nut 216) may be rotatable relative to the screw 215. During this relative rotation, the interaction of the threads 203, 218 may influence the screw 215 to advance and/or retract along the axis 250 of the chuck body 220.

The forward end of the screw 215 may include radially oriented passageways 215a in which the chuck jaws 202 are respectively supported. The radially oriented passageways 215a may guide a radial movement of the chuck jaws 202, and at the same time may rotationally fix the chuck jaws 202 to the screw 215.

The chuck body 220 may support a two-part sleeve inclusive of a front sleeve 206 and a rear sleeve 204. The front sleeve 206 may be mounted for rotation on the chuck body 220. The chuck body 220 may extend through an opening of the front sleeve 206. The forward end of the front sleeve 206 may fixedly support a cone 209. In this example embodiment, and with reference to FIG. 6, the front sleeve 206 and the cone 209 may be provided as two separate elements to facilitate assembly of the tool chuck 275. It will be appreciated, however, that the front sleeve 206 and the cone 209 may be formed of a unitary, one-piece construction.

The cone 209 may include passageways 209a through which the chuck jaws 202 are respectively slidable. The passageways 209a of the cone 209 may be inclined relative to the axis 250 of the chuck body 220. In this way, when the chuck jaws 202 are advanced (via the screw 215), the passageways 209a of the cone 209 may influence the chuck jaws 202 in a radial inward direction through the radially oriented passageways 215a of the screw 215 and toward the axis 250. And when the chuck jaws 202 are retracted (via the screw 215), the passageways 209a of the cone 209 may influence the chuck jaws 202 in a radial outward direction through the radially oriented passageways 215a of the screw 215 and away from the axis 250. The passageways 209a in the cone 209 may rotationally fix the cone 209 to the chuck jaws 202. Thus, the chuck jaws 202, the cone 209, the front sleeve 206, and the screw 215 may be rotationally fixed together.

The rear end of the front sleeve 206 may fixedly support an output gear 226. The chuck body 220 may extend through an opening of the output gear 226. The rear face of the output gear 226 may be provided with a set of teeth 214. In this example embodiment, and with reference to FIG. 6, the front sleeve 206 and the output gear 226 may be provided as two separate elements to facilitate assembly of the tool chuck 275, and to allow for a convenient manner in which the output gear 226 may be removed and replaced by a new or alternative output gear (e.g., an output gear having a different number of teeth). It will be appreciated, however, that the front sleeve 206 and the output gear 226 may be formed of a unitary, one-piece construction.

The rear sleeve 204 may be mounted for rotation on the chuck body 220. The chuck body 220 may extend through an opening of the rear sleeve 204. The rear sleeve 204 may be rotatable relative to the front sleeve 206. The rear sleeve 204 may have a front face 207 that is inclined relative to the axis 250 of the chuck body 220. The front face 207 of the rear sleeve 204 may act upon the rear face of a nutating gear 210. As shown in FIG. 6, the rear sleeve 204 may be of a two-part construction to facilitate assembly. The two parts 204a, 204b of the rear sleeve 204 may be assembled together to support opposing sides of the nutating gear 210. It will be appreciated, however, that the rear sleeve 204 may be of a unitary, one-piece construction.

The nutating gear 210 may be arranged in the tool chuck 275 such that its axis is inclined relative to the axis 250 of the chuck body 220. The chuck body 220 may extend through an opening of the nutating gear 210. The nutating gear 210 may be mounted in such a way that it remains rotationally fixed relative to the chuck body 220. That is, the nutating gear 210 may nutate without rotating relative to the chuck body 220 about the axis 250. To this end, the nutating gear 210 may include radially inward facing features that may cooperate with the spherical splines 217 provided on the chuck body 220. In this example embodiment, the radially inward facing features may be in the form of passages 211 that respectively receive the spherical splines 217. The passages 211 may extend along a longitudinal axis of the nutating gear 210. Thus, as the nutating gear 210 nutates, the spherical splines 217 may pass back and forth through the passages 211 and at the same time may prevent the nutating gear 210 from rotating relative to the chuck body 220.

A bearing (not illustrated) may be interposed between the rear sleeve 204 and the nutating gear 210 to facilitate a relative rotational movement between the rear sleeve 204 and the nutating gear 210. The front face of the nutating gear 210 may be provided with a set of teeth 212. The teeth 212 of the nutating gear 210 may engage with the teeth 214 of the output gear 226.

The nutating gear 210 may be inclined relative to the output gear 226 so that the teeth 212 of nutating gear 210 may only touch the teeth 214 of the output gear 226 at one contact area 225. Thus, the diameter and circumference of the nutating gear 210 may be larger than that of the output gear 226. Further, the corresponding sets of teeth 212, 214 may be of the same pitch so that the larger nutating gear 210 may have more teeth 212 around its circumference than does the smaller output gear 226.

It will be appreciated that the nutating gear 210 may be rotationally fixed to the chuck body 220 by structure other than the spherical splines 217. For example, and briefly turning to FIG. 5B, a fixing gear 205 may be fixed to the chuck body 220. The front face of the fixing gear 205 may include a set of teeth 213b that engage with a set of teeth 213a provided on a rear face of the nutating gear 210. The number N2 of teeth 213b on the fixing gear 205 and the number N1 of teeth 213a on the nutating gear 210 may be selected so that the nutating gear 210 and the fixing gear 205 (and thus the chuck body 220) maintain the same relative rotational positions with respect to each other. Here, opposite faces of the nutating gear 210 have respective sets of teeth 212 and 213a. Thus, the fixing gear 205 and the output gear 226 may be provided on opposite sides of the nutating gear 210.

Figure 5B:
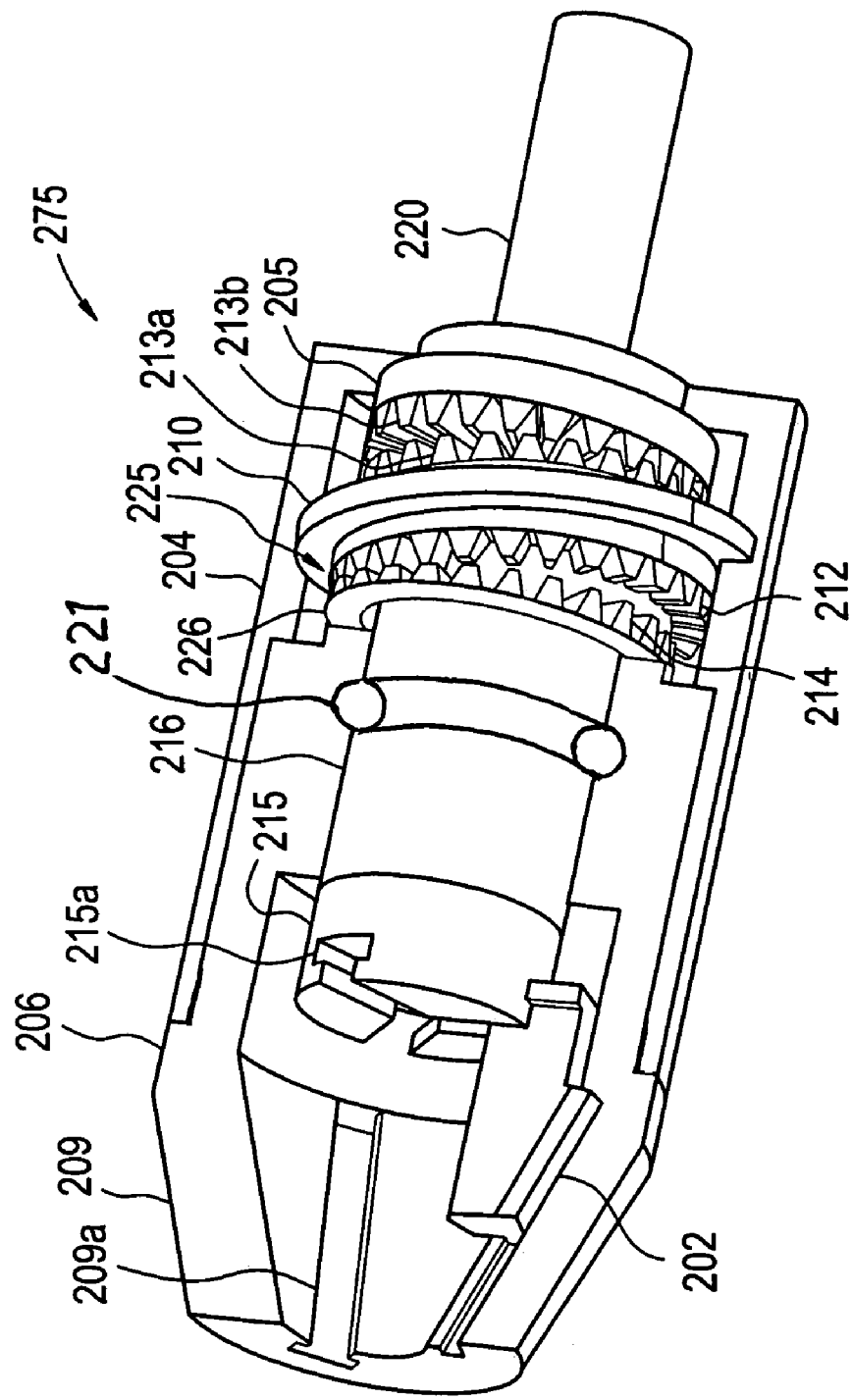

As shown in FIG. 5B, a bearing 221 may be provided between the chuck body 220 and the front sleeve 206. To this end, the chuck body 220 and the front sleeve 206 may be provided with cooperating grooves in which the bearing 221 is provided. The bearing 221 may axially fix together and facilitate a relative rotation between the chuck body 220 and the front sleeve 206. In other respects, the tool chuck 275 depicted in FIG. 5B may be similar to the tool chuck 275 depicted in FIG. 5A.

B. The Operation:

The tool chuck 275 may operate as follows. An operator may turn the rear sleeve 204 relative to the chuck body 220 and the nutating gear 210. The rotation of the rear sleeve 204 may cause the nutating gear 210, which may remain rotationally fixed relative to the chuck body 220 (via the spherical splines 217 shown in FIG. 5A and/or the fixing gear 205 shown in FIG. 5B, for example), to nutate about the chuck body 220. As the nutating gear 210 nutates, the contact area 225 between the nutating gear 210 and the output gear 226 may move around the circumference of the chuck body 220.

As stated above, the nutating gear 210 may be rotationally fixed. Thus, during one nutation of the nutating gear 210, the output gear 226 may be driven to rotate by an angular distance equivalent to the difference between the number N3 of teeth 212 of the nutating gear 210 and the number N4 of teeth 214 of the output gear 226.

The driven output gear 226 may rotate together with the front sleeve 206 and the cone 209. The cone 209 (via the passageways 209a) rotates together with the chuck jaws 202. The chuck jaws 202 (seated in radial passageways 215a) may drive the screw 215 to rotate relative to the nut 216 of the chuck body 220. This relative rotation may advance or retract the screw 215 along the axis 250 (depending on the rotation direction) by virtue of the interaction between the radially inward facing threads 218 and the radially outward facing threads 203. As the screw 215 advances or retracts relative to the chuck body 220, the screw 215 may push or pull on the chuck jaws 202, thereby opening and/or closing the same.

For example, during a closing operation, the screw 215 (together with the chuck jaws 202) may be rotated relative to the chuck body 220 and advanced along the axis 250 of the chuck body 220. During this time, the chuck jaws 202 may advance through (and be guided by) the inclined passageways 209a of the cone 209. The inclined passageways of the cones 209 may influence the chuck jaws 202 in a radial inward direction (i.e., toward the axis 250) through the radially oriented passageways of the screw 215.

During actuation of the chuck jaws 202, the rear sleeve 204 and the front sleeve 206 may rotate relative to the chuck body 220. Further, the rear sleeve 204 and front sleeve 206 may rotate relative to each other. Relative to the chuck body 220, the rear sleeve 204 may rotate in a direction that is counter to the rotational direction of the front sleeve 206.

As in the previous embodiments, the difference in the number N3 of teeth 212 provided on the nutating gear 210 and the number N4 of teeth 214 provided on the output gear 226 may be varied to alter the final output drive ratio of the output gear 226.

IV. Example Embodiment Depicted in FIG. 7

Figure 7:
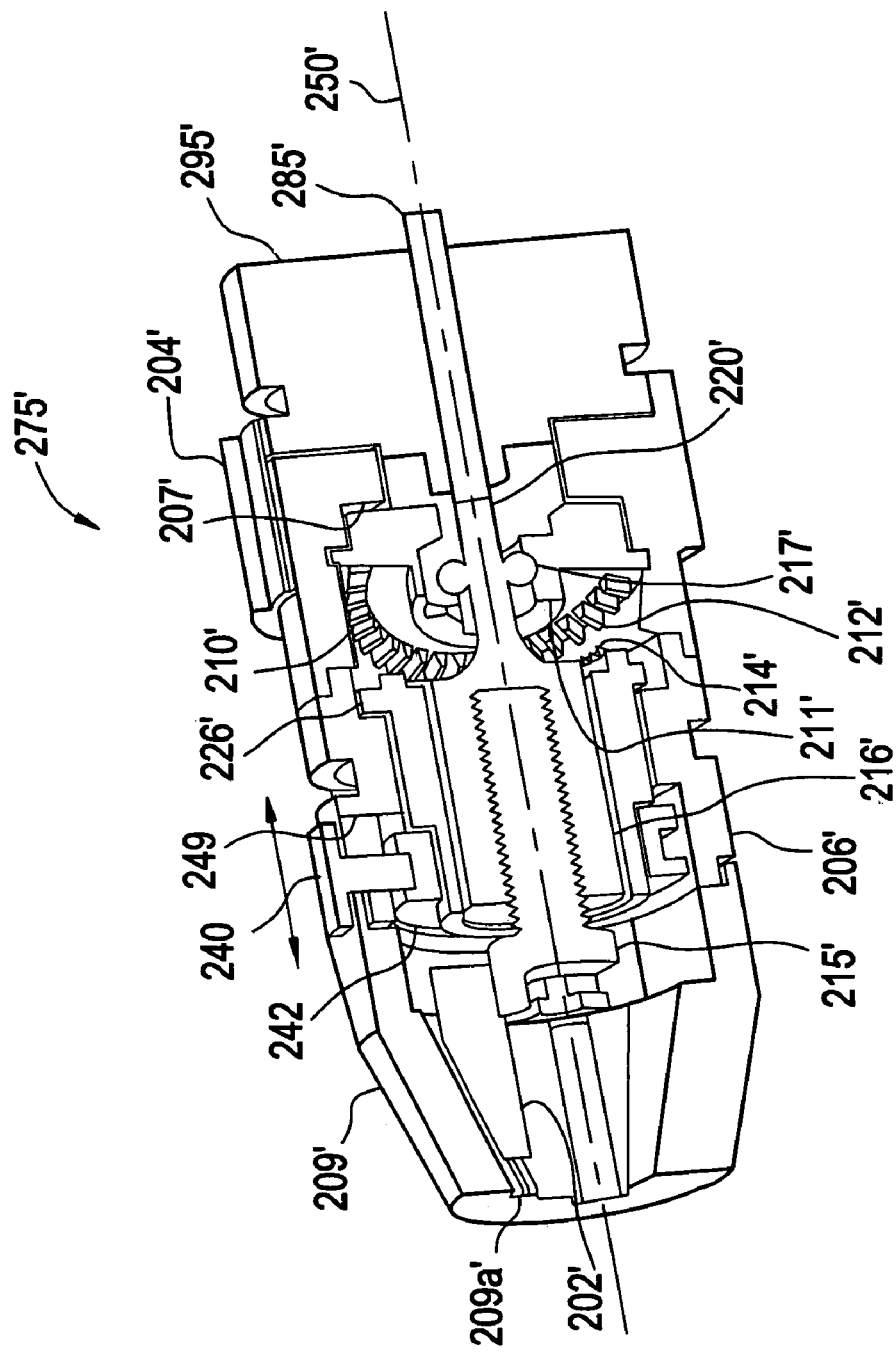
FIG. 7 is a schematic illustration of a tool chuck with a nutating gear reduction according to another example, non-limiting embodiment of the present invention.

FIG. 7 shows another example, non-limiting embodiment of a tool chuck 275' with a nutating gear reduction. This example embodiment is similar to the example embodiment discussed above in section III. However, this example embodiment may additionally include a switch 240 for disabling the nutating gear reduction mechanism, as described below.

A. The Structure:

With reference to FIG. 7, the tool chuck 275' may include a chuck body 220' defining an axis 250'. The rear end of the chuck body 220' may be mounted on a spindle 285' of a power driver 295'.

An intermediate portion of the chuck body 220' may be provided with splines 217' that interact with radially inward facing passages of a nutating gear 210'.

The forward end of the chuck body 220' may include a nut 216'. The nut 216' may be screw coupled to a screw 215'. The nut 216' may have radially interior threads that engage radially outward facing threads of the screw 215'. The chuck body 220' (together with the nut 216') may be rotatable relative to the screw 215' to advance and/or retract the screw 215' along the axis 250' of the chuck body 220'.

The forward end of the screw 215 may include radially oriented passageways in which the chuck jaws 202' are respectively supported. The radially oriented passageways may guide a radial movement of the chuck jaws 202', and at the same time may rotationally fix the chuck jaws 202' to the screw 215'.

The chuck body 220' may support a two-part sleeve inclusive of a front sleeve 206' and a rear sleeve 204'. The front sleeve 206' may be mounted for rotation on the chuck body 220'. The forward end of the front sleeve 206' may fixedly support a cone 209'. The cone 209' may include passageways 209a' through which the chuck jaws 202' are respectively slidable. The passageways 209a' in the cone 209' may rotationally fix the cone 209' to the chuck jaws 202'. Thus, the chuck jaws 202', the cone 209', the front sleeve 206', and the screw 215' may be rotationally fixed together.

The front sleeve 206' may support an output gear 226'. Similar to the previous embodiment, the output gear 226' and the front sleeve 206' may be rotationally fixed together. In contrast to the previous embodiment, the output gear 226' may be axially moveable (i.e., in the direction of the axis 250') relative to the front sleeve 206'. For example, the front sleeve 206' and the output gear 226' may be coupled together via cooperating splines that extend in a longitudinal direction. The cooperating splines may be respectively provided on the radially inward facing surface of the front sleeve 206' and the radially outward facing surface of the output gear 226'. Such spline couplings (and other alternative couplings) are well known in this art. The output gear 226' (which may be rotationally fixed to the front sleeve 206') may be rotatable relative to the chuck body 220' (and thus the nut 216'). The rear face of the output gear 226 may be provided with a set of teeth 214'.

The front sleeve 206' may support the switch 240. The switch 240 may be moveable in the axial direction relative to the sleeve 206'. The front sleeve 206' may include a slot 249 for guiding the longitudinal movement of the switch 240. The radially inward end of the switch 240 may be fixedly connected to a shift ring 242. The shift ring 242 may be fixedly mounted on the output gear 226'. Thus, the switch 240, the shift ring 242, and the output gear 226' may be moveable together along the axis 250' relative to the front sleeve 206' and the chuck body 220' (and thus the nut 216').

The rear sleeve 204' may be mounted for rotation on the chuck body 220'. The rear sleeve 204' may be rotatable relative to the front sleeve 206'. The rear sleeve 204' may have a front face 207' that is inclined relative to the axis 250' of the chuck body 220'. The front face 207' of the rear sleeve 204' may act upon the rear face of a nutating gear 210'.

The nutating gear 210' may be arranged in the tool chuck 275' such that its axis is inclined relative to the axis 250' of the chuck body 220'. The nutating gear 210' may be mounted in such a way that it remains rotationally fixed relative to the chuck body 220'. To this end, the nutating gear 210' may include radially inward facing passages 211' that may respectively cooperate with the spherical splines 217'. As the nutating gear 210' nutates, the spherical splines 217' may pass back and forth through the passages 211' and at the same time may prevent the nutating gear 210' from rotating relative to the chuck body 220'.

The front face of the nutating gear 210' may be provided with a set of teeth 212'. The teeth 212' of the nutating gear 210' may engage with the teeth 214' of the output gear 226'.

B. The Operation:

The tool chuck 275' may operate differently depending on the axial position of the switch 240. On the one hand, when the switch 240 is in the axial rearward position, the nutating gear reduction mechanism may be enabled so that a user may have a mechanical advantage in tightening the chuck jaws 202'. On the other hand, when the switch 240 is in the axial forward position, the nutating gear reduction mechanism may be disabled so that the user may tighten the chuck jaws 202' more rapidly and without the mechanical advantage.

More specifically, the operator may push the switch 240 in an axially rearward direction through the slot 249 of the front sleeve 206'. The rearward axial movement of the switch 240 may impart a corresponding rearward axial movement of shift ring 242 and the output gear 226' relative to the chuck body 220'. During this movement, the nut 216' may pass through an opening in the output gear 226'.

With the switch 240 in the axial rearward position, the teeth 214' of the output gear 226' may be engaged with the teeth 212' of the nutating gear 210', thereby enabling the nutating gear reduction mechanism. The operator may then turn the rear sleeve 204' to actuate the tool chuck 275' as described above in section III.

The operator may push the switch 240 in an axially forward direction through the slot 249 of the front sleeve 206'. The forward axial movement of the switch 240 may impart a corresponding forward axial movement of shift ring 242 and the output gear 226' relative to the chuck body 220'. During this movement, the nut 216' may pass through an opening in the output gear 226'.

With the switch 240 in the axial forward position, the teeth 214' of the output gear 226' may be disengaged from the teeth 212' of the nutating gear 210', thereby disabling the nutating gear reduction mechanism. The operator may then turn the front sleeve 206' (and thus the cone 209') relative to the chuck body 220'. The cone 209' may rotate together with the chuck jaws 202' and the screw 215'. The relative rotation between the screw 215' and the nut 216' may advance or retract the screw 215' along the axis 250' (depending on the rotation direction of the front sleeve 206'). As the screw 215' advances or retracts relative to the chuck body 220', the screw 215' may push or pull on the chuck jaws 202', thereby closing or opening the same.

V. Example Embodiment Depicted in FIG. 8

Figure 8:
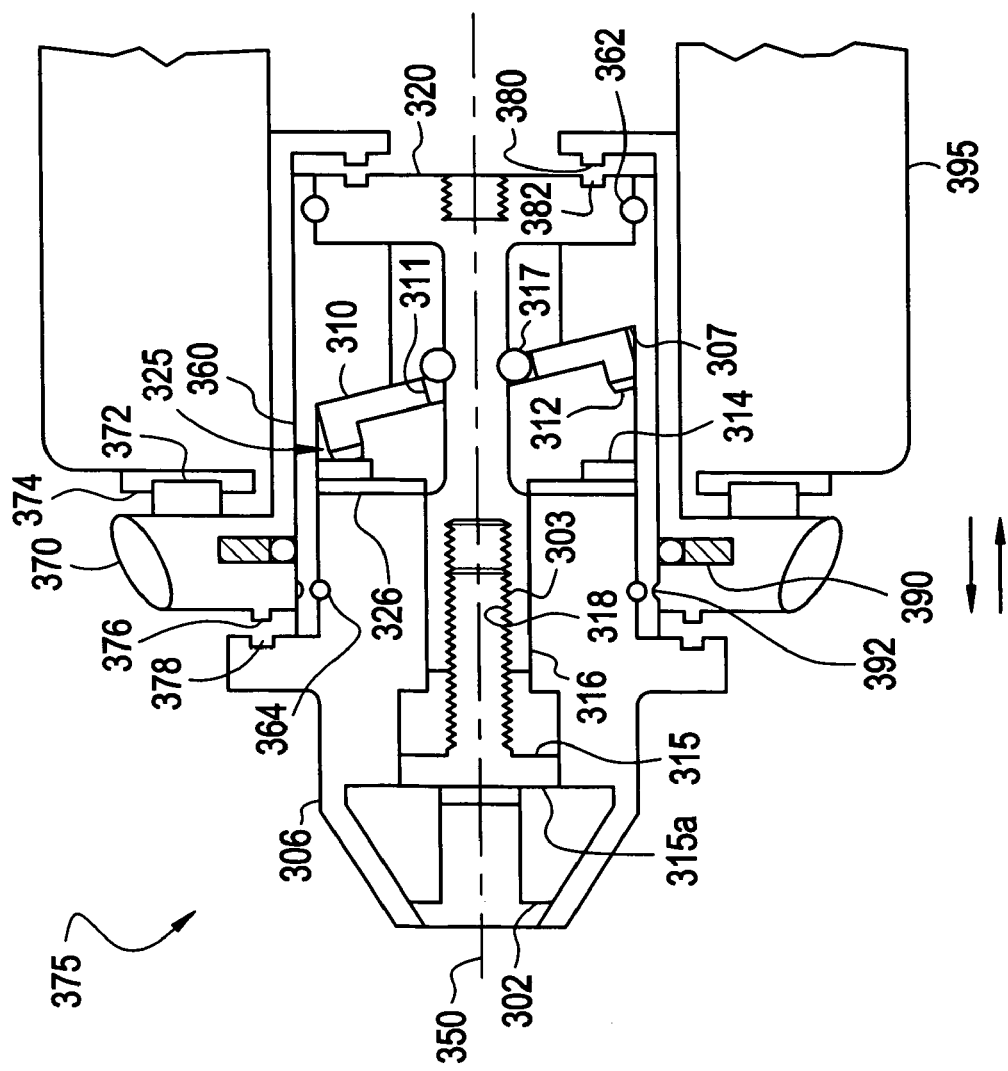
FIG. 8 is a schematic illustration of a tool chuck with a nutating gear reduction according to another example, non-limiting embodiment of the present invention.

FIG. 8 shows another example, non-limiting embodiment of a tool chuck 375 with a nutating gear reduction. This example embodiment is similar to the previous example embodiments to the extent that it includes a nutating gear reduction. Also, this example embodiment may implement "pusher" chuck jaws 302. However, there are several notable differences as described below.

A. The Structure:

With reference to FIG. 8, the tool chuck 375 may include a chuck body 320. The rear end of the chuck body 320 may be mounted on a spindle of a power driver 395.

An intermediate portion of the chuck body 320 may be provided with splines 317 that interact with radially inward facing passages 311 of a nutating gear 310 so that the chuck body 320 and the nutating gear 310 are rotationally fixed together. In this example embodiment, the splines 317 may have a spherical shape. However, it will be appreciated that splines 317 having numerous, alternative shapes may be suitably implemented. In this example embodiment, four splines 317 may be uniformly spaced around the circumference of the chuck body 320. However, the invention is not limited in this regard. For example, the number and the spacing between the splines 317 may be varied.

The forward end of the chuck body 320 may include a nut 316. The nut 316 may be screw coupled to a screw 315. To this end, the nut 316 may have radially interior threads 318 that engage radially outward facing threads 303 of the screw 315. The chuck body 320 (together with the nut 316) may be rotatable relative to the screw 315. During this relative rotation, the interaction of the threads 303, 318 may influence the screw 315 to advance and/or retract along the axis 350 of the chuck body 320.

The forward end of the screw 315 may include radially oriented passageways 315a in which the chuck jaws 302 are respectively supported. The radially oriented passageways 315a may guide a radial movement of the chuck jaws 302, and at the same time may rotationally fix the chuck jaws 302 to the screw 315.

The chuck body 320 may support a nutating mechanism housing ("NMH") sleeve 360. The NMH sleeve 360 may be rotatable relative to the chuck body 320. Such relative rotation may be facilitated by a bearing 362. The NMH sleeve 360 may have a front face 307 that is inclined relative to the axis 350 of the chuck body 320. The front face 307 of the NMH sleeve 360 may act upon the rear face of the nutating gear 310.

The NMH sleeve 360 may support a front sleeve 306 and a clutch and lock ("CL") sleeve 370. The front sleeve 306 may be rotatable relative to the NMH sleeve 360. This relative rotation may be facilitated by a bearing 364. The front sleeve 306 may include passageways through which the chuck jaws 302 are respectively slidable. The passageways of the front sleeve 306 may be inclined relative to the axis 350 of the chuck body 320. In this way, when the chuck jaws 302 are advanced (via the screw 315), the passageways of the front sleeve 306 may influence the chuck jaws 302 in a radial inward direction through the radially oriented passageways 315a of the screw 315 and toward the axis 350. And when the chuck jaws 302 are retracted (via the screw 315), the passageways of the front sleeve 306 may influence the chuck jaws 302 in a radial outward direction through the radially oriented passageways 315a of the screw 315 and away from the axis 350. The passageways in the front sleeve 306 may rotationally fix the front sleeve 306 to the chuck jaws 302. Thus, the chuck jaws 302, the front sleeve 306, and the screw 315 may be rotationally fixed together.

The rear end of the front sleeve 306 may fixedly support an output gear 326. The chuck body 320 may extend through an opening of the output gear 326. The rear face of the output gear 326 may be provided with a set of teeth 314.

The nutating gear 310 may be arranged in the tool chuck 375 such that its axis is inclined relative to the axis 350 of the chuck body 320. The chuck body 320 may extend through an opening of the nutating gear 310. The nutating gear 310 may be mounted in such a way that it remains rotationally fixed relative to the chuck body 320. That is, the nutating gear 310 may nutate without rotating relative to the chuck body 320 about the axis 350. To this end, the nutating gear 310 may include radially inward facing features that may cooperate with the spherical splines 317 provided on the chuck body 320. In this example embodiment, the radially inward facing features may be in the form of passages 311 that respectively receive the spherical splines 317. The passages 311 may extend along a longitudinal axis of the nutating gear 310. Thus, as the nutating gear 310 nutates, the spherical splines 317 may pass back and forth through the passages 311 and at the same time may prevent the nutating gear 310 from rotating relative to the chuck body 320.

It will be appreciated that the nutating gear 310 may be rotationally fixed to the chuck body 320 by structure other than the spherical splines 317.

A bearing (not illustrated) may be interposed between the NMH sleeve 360 and the nutating gear 310 to facilitate a relative rotational movement between the NMH sleeve 360 and the nutating gear 310. The front face of the nutating gear 310 may be provided with a set of teeth 312. The teeth 312 of the nutating gear 310 may engage with the teeth 314 of the output gear 326.

The nutating gear 310 may be inclined relative to the output gear 326 so that the teeth 312 of nutating gear 310 may only touch the teeth 314 of the output gear 326 at one contact area 325. Thus, the diameter and circumference of the nutating gear 310 may be larger than that of the output gear 326. Further, the corresponding sets of teeth 312, 314 may be of the same pitch so that the larger nutating gear 310 may have more teeth 312 around its circumference than does the smaller output gear 326.

The CL sleeve 370 may be mounted on the NMH sleeve 360 so that the CL sleeve 370 may be axially moveable relative to the NMH sleeve 360 and rotationally fixed to the NMH sleeve 360. For example, the radially inward facing surface of the CL sleeve 360 may include longitudinal splines (not illustrated) that cooperate with corresponding features provided on the radially outward facing surface of the NMH sleeve 360. Such coupling features are well known in this art, and therefore a detailed discussion of the same is omitted.

The CL sleeve 370 may be axial moveable relative to the NMH sleeve 360 between the illustrated rearward position (or "chuck drive mode") and a forward position (or "chuck lock mode"). As shown in FIG. 8, in the chuck drive mode, a rear face of the CL sleeve 370 may include features 372 that engage with corresponding features 374 provided on the driver housing. The features 372, 374 may cooperate to rotationally fix the CL sleeve 370 (and thus the NMH sleeve 360) to the driver housing. The features 372, 374 may be designed to have profiles so that they separate from each other when a predetermined torque is applied between the CL sleeve 370 and the driver housing.

In the chuck lock mode, a front face of the CL sleeve 370 may include protrusions 376 that engage with corresponding recesses 378 provided on a rear face of the front sleeve 306. The protrusions 376 and the recesses 378 may cooperate to rotationally fix the CL sleeve 370 (and thus the NMH sleeve 360) to the front sleeve 306. Also, another front face of the CL sleeve 370 may include protrusions 380 that engage with corresponding recesses 382 provided on a rear face of the chuck body 320. The protrusions 380 and the recesses 382 may cooperate to rotationally fix the CL sleeve 370 (and thus the NMH sleeve 360) to the chuck body 320. In the chuck lock mode, the CL sleeve 370, the NMH sleeve 360, the front sleeve 306, and the chuck body 320 may be rotationally fixed together. The CL sleeve 370 may include a spring loaded detent mechanism 390 that cooperates with a recess 392 provided in the NMH sleeve 360 to provisionally retain the CL sleeve 370 in the chuck lock mode.

B. The Operation:

The tool chuck 375 may operate differently depending on the axial position of the CL sleeve 370.

An operator may push the CL sleeve 370 in an axial rearward direction, as illustrated in FIG. 8, to operate the tool chuck 375 in the chuck drive mode. The chuck drive mode may allow the operator to utilize the output of the driver 395 to actuate the chuck jaws 302. This may speed the chuck jaw actuation process, as compared to the manually operated tool chuck described with respect to the previous embodiments.

In the chuck drive mode depicted in FIG. 8, and as stated above, the cooperating features 372, 374 may be engaged to rotationally fix together the CL sleeve 370 (and thus the NMH sleeve 360) and the driver housing. Further, as shown, the protrusions 376 of the CL sleeve 370 may be disengaged from the recesses 378 of the front sleeve 306, and the protrusions 380 of the CL sleeve 370 may be disengaged from the recesses 382 of chuck body 320. Thus, the front sleeve 306 may be rotatable relative to the CL sleeve 370, and the chuck body 320 may be rotatable relative to the CL sleeve 370.

The operator may then actuate the driver 395 to rotate the chuck body 320. The chuck body 320, by virtue of the splines 317, may rotate together with the nutating gear 310 relative to the NMH sleeve 360 (which may be rotationally fixed to the CL sleeve 370 and the driver housing). By virtue of the relative rotation between the nutating gear 310 and the NMH sleeve 360, the front surface 307 of the NMH sleeve 360 may cause the nutating gear 310 to nutate about the chuck body 320. As the nutating gear 310 rotates relative to the NMH sleeve 360 and nutates about the chuck body 320, it may rotationally drive the front sleeve 306 via the interaction between the teeth 312, 314.

During one revolution of the chuck body 320, the nutating gear 310 may drive the output gear 326 (and thus the front sleeve 306) to rotate by one full revolution plus an angular distance equivalent to the difference between the number N3 of teeth 312 of the nutating gear 310 and the number N4 of teeth 314 of the output gear 326. At the same time, the nut 316 of the chuck body 320 may rotate through one full revolution. In this way, a speed differential may be achieved between the rotationally driven front sleeve 306 and the rotationally driven nut 316. And since the front sleeve 306 may rotate together with the chuck jaws 302, the chuck jaws 302 (seated in the radial passageways 315a) may drive the screw 315 to rotate relative to the nut 316 of the chuck body 320. This relative rotation may advance or retract the screw 315 along the axis 350 (depending on the rotation direction of the chuck body 320) by virtue of the interaction between the radially inward facing threads 318 and the radially outward facing threads 303. As the screw 315 advances or retracts relative to the chuck body 320, the screw 315 may push or pull on the chuck jaws 302, thereby opening and/or closing the same.

As in the previous embodiments, the difference in the number N3 of teeth 312 provided on the nutating gear 310 and the number N4 of teeth 314 provided on the output gear 326 may be varied to alter the final output drive ratio of the output gear 326.

The cooperating features 372, 374 may function to limit the torque between the CL sleeve 370 and the driver housing. This torque limiting feature may take the operator out of the process, thereby effectively preventing the tool chuck from over tightening.

Once a tool is clamped by the chuck jaws 302, the operator may push the CL sleeve 370 in an axial forward direction to operate the tool chuck 375 in the chuck lock mode. The chuck lock mode may prevent the chuck jaws 302 from loosening. Such loosening may occur, for example, when the tool clamped by the chuck jaws 302 is driven in a reverse direction (for example, when backing out a screw). The rotational resistance of the screw may influence the chuck jaws 302 (and therefore the screw 315) to rotate relative to the nut 316. Such relative rotation may result in a reduction of the clamping pressure exerted by the chuck jaws 302. In a worst case scenario, the chuck jaws 302 may be rotationally driven while slipping occurs between the chuck jaws 302 and the tool.

In the chuck lock mode, the cooperating features 372, 374 may be disengaged so that the CL sleeve 370 (and thus the NMH sleeve 360) may be rotatable relative to the driver housing. Further, the protrusions 376 of the CL sleeve 370 may be engaged with the recesses 378 of the front sleeve 306, and the protrusions 380 of the CL sleeve 370 may be engaged with the recesses 382 of chuck body 320. Thus, the CL sleeve 370, the NMH sleeve 360, and the front sleeve 306 may be rotatable together with the chuck body 320. When the operator actuates the driver 395, the entire tool chuck 375 may rotate together as a single unit. The detent mechanism 390 cooperating with the recess 392 may retain the CL sleeve in the axially forward position.

In the chuck lock mode, the CL sleeve 370 may prevent any relative rotation from occurring between the front sleeve 306 (and thus the chuck jaws 302 and the screw 315) and the chuck body 320 (and thus the nut 316). In this way, the CL sleeve 370 may prevent the chuck jaws 302 from loosening.

It will be appreciated that the CL sleeve may be suitably implemented in other embodiments of the invention. For example, with slight modifications that will become apparent in view of the present disclosure, the CL sleeve may be incorporated into the example embodiments discussed above in sections III and IV. The incorporated CL sleeve may serve the same advantageous functions described above.

The various embodiments include chuck bodies that may be separate and distinct elements from the spindle of the driver. However, it will be readily apparent to those skilled in the art that the spindle and the chuck body may be of a unitary, one-piece construction.

What is claimed is:

1. A tool chuck comprising:
   a chuck body supporting chuck jaws, the chuck body defining a longitudinal axis;
   a driven gear provided on the chuck body;
   a threaded coupling provided one of (1) between the chuck jaws and the driven gear and (2) between the chuck jaws and the chuck body; and
   a nutating gear provided on the chuck body, the nutating gear having an axis that is inclined relative to the longitudinal axis of the chuck body, the nutating gear being nutatable about the chuck body to rotationally drive the driven gear relative to the chuck body, thereby actuating the threaded coupling move the chuck jaws along the longitudinal axis of the chuck body.

2. The tool chuck as set forth in claim 1, wherein the nutating gear is mounted for rotation on the chuck body.

3. The tool chuck as set forth in claim 1, wherein the nutating gear is rotationally fixed to the chuck body.

4. The tool chuck as set forth in claim 1 comprising a fixing gear fixed to the chuck body and engaged with the nutating gear.

5. The tool chuck as set forth in claim 4, wherein the fixing gear is positioned between the nutating gear and the driven gear.

6. The tool chuck as set forth in claim 4, wherein the nutating gear is positioned between the fixing gear and the driven gear.

7. The tool chuck as set forth in claim 1, wherein the nutating gear is spline coupled to the chuck body.

8. The tool chuck as set forth in claim 7, wherein the chuck body has splines that are respectively received in passages provided in the nutating gear.

9. The tool chuck as set forth in claim 8, wherein the splines have a spherical shape.

10. The tool chuck as set forth in claim 1, wherein the driven gear is a nut.

11. The tool chuck as set forth in claim 10, wherein the nut is screw coupled to the jaws.

12. The tool chuck as set forth in claim 10, wherein the nut is screw coupled to a screw that is rotationally fixed to the jaws.

13. The tool chuck as set forth in claim 1, wherein the driven gear is an output gear rotationally fixed to a sleeve that is mounted for rotation on the chuck body.

14. The tool chuck as set forth in claim 13, wherein the output gear is moveable along the longitudinal axis of the chuck body between
 a first position in which the output gear is disengaged from the nutating gear, and
 a second position in which the output gear is engaged with the nutating gear.

15. The tool chuck as set forth in claim 1, wherein the chuck body has an end provided with a blind hole.

16. The tool chuck as set forth in claim 15, wherein the blind hole has a hexagonal shape.

17. A tool chuck comprising:
 a chuck body having a longitudinal axis;
 a driven gear mounted for rotation on the chuck body, the driven gear having a rotational axis that is parallel to the longitudinal axis; and
 a drive gear mounted on the chuck body, the drive gear having an axis that is inclined relative to the longitudinal axis of the chuck body, the drive gear being nutatable about the chuck body to rotationally drive the driven pear relative to the chuck body.

18. The tool chuck as set forth in claim 17, wherein the chuck body has an end provided with a blind hole.

19. The tool chuck as set forth in claim 18, wherein the blind hole has a hexagonal shape.

20. A tool chuck comprising:
 a chuck body;
 a front sleeve mounted for rotation on the chuck body, the front sleeve supporting a driven gear;
 a nutating gear provided on the chuck body, the nutating gear having an axis that is inclined relative to the longitudinal axis of the chuck body, the nutating gear being nutatable about the chuck body to rotationally drive the driven gear relative to the chuck body;
 a housing sleeve in which the nutating gear is provided, the housing sleeve mounted for rotation on the chuck body, the housing sleeve rotatably supporting the front sleeve; and
 a clutch and lock sleeve rotationally fixed to the housing sleeve, the clutch and lock sleeve being axially moveable relative to the housing sleeve between
 a first position that permits relative rotation between the chuck body and the front sleeve, and
 a second position that rotationally locks together the chuck body and the front sleeve.

21. A tool chuck comprising:
 a chuck body supporting chuck jaws, the chuck body defining a longitudinal axis;
 a driven gear provided on the chuck body;
 a threaded coupling provided between the chuck jaws and the chuck body; and
 a nutating gear provided on the chuck body, the nutating gear being nutatable about the chuck body to rotationally drive the driven gear relative to the chuck body, thereby actuating the threaded coupling to move the chuck jaws along the longitudinal axis of the chuck body;
 wherein the driven gear is an output gear rotationally fixed to a sleeve that is mounted for rotation on the chuck body; and
 wherein the output gear is moveable along the longitudinal axis of the chuck body between
 a first position in which the output gear is disengaged from the nutating gear, and
 a second position in which the output gear is engaged with the nutating gear.

* * * * *